United States Patent
Kuge et al.

(10) Patent No.: US 6,982,647 B2
(45) Date of Patent: Jan. 3, 2006

(54) DRIVING ASSIST SYSTEM FOR VEHICLE

(75) Inventors: Nobuyuki Kuge, Minneapolis, MN (US); Tomohiro Yamamura, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 148 days.

(21) Appl. No.: 10/462,733

(22) Filed: Jun. 17, 2003

(65) Prior Publication Data

US 2003/0236602 A1 Dec. 25, 2003

(30) Foreign Application Priority Data

Jun. 20, 2002 (JP) .......................... 2002-179913

(51) Int. Cl.
*G08B 23/00* (2006.01)

(52) U.S. Cl. ................. 340/576; 340/435; 340/903; 701/65; 701/70; 701/96; 701/300; 74/513

(58) Field of Classification Search ................ 340/576, 340/435, 436, 903; 701/65, 66, 70, 79, 96, 701/300, 301; 74/513
See application file for complete search history.

(56) References Cited

U.S. PATENT DOCUMENTS

| | | | | |
|---|---|---|---|---|
| 6,095,945 A | * | 8/2000 | Graf ............................ | 477/97 |
| 2003/0195684 A1 | * | 10/2003 | Martens ....................... | 701/41 |
| 2004/0155811 A1 | * | 8/2004 | Albero et al. ................ | 342/70 |

FOREIGN PATENT DOCUMENTS

| | | |
|---|---|---|
| DE | 195 06 629 | 8/1996 |
| DE | 196 20 929 | 11/1997 |
| DE | 199 16 434 | 10/2000 |
| JP | 56-108953 U | 8/1981 |
| JP | 57-033048 | 2/1982 |
| JP | 57-167845 | 10/1982 |
| JP | 62-51035 U | 3/1987 |
| JP | 63-258225 | 10/1988 |

(Continued)

OTHER PUBLICATIONS

Copending patent application entitled "Accelerator Pedal Device", Masahiro EGAMI, filed Jun. 17, 2003, our reference No. 61355–039.

Copending patent application entitled "Accelerator Pedal Device", Masahiro EGAMI, filed Jun. 13, 2003, our reference No. 61355–040.

Copending patent application entitled "Driving Assist System for Vehicle", Masahiro EGAMI, filed Jun. 17, 2003, our reference No. 61355–042.

*Primary Examiner*—Daniel Wu
*Assistant Examiner*—Samuel J. Walk
(74) *Attorney, Agent, or Firm*—McDermott Will & Emery LLP

(57) ABSTRACT

A vehicle driving assist system comprises a travel situation detection device that detects a vehicle condition and a traveling environment around a subject vehicle; a risk potential calculation device that calculates a risk potential around the subject vehicle based upon detection results of the traveling situation detection device; an accelerator pedal reaction force calculation device that calculates an accelerator pedal reaction force command value based upon the risk potential which is calculated by the risk potential calculation device; an accelerator pedal reaction force generation device that generates an actuation reaction force for an accelerator pedal, according to the accelerator pedal reaction force command value which is calculated by the accelerator pedal reaction force calculation device; a driving intention detection device that detects a driving intention of an operator of the subject vehicle; and an accelerator pedal reaction force modification device that adjusts the actuation reaction force to be generated for the accelerator pedal, based upon a detection result of the driving intention detection device.

21 Claims, 13 Drawing Sheets

FOREIGN PATENT DOCUMENTS

| | | |
|---|---|---|
| JP | 02-291099 | 11/1990 |
| JP | 03-217627 | 9/1991 |
| JP | 05-231194 | 9/1993 |
| JP | 05-345536 | 12/1993 |
| JP | 7-4211 U | 1/1995 |
| JP | 08-017000 | 1/1996 |
| JP | 08-166448 | 6/1996 |
| JP | 08-263160 | 10/1996 |
| JP | 09-254677 | 9/1997 |
| JP | 10-166889 | 6/1998 |
| JP | 10-166890 | 6/1998 |
| JP | 10-318009 | 12/1998 |
| JP | 10-338110 | 12/1998 |
| JP | 2000-54860 | 2/2000 |
| JP | 2000-158970 | 6/2000 |
| JP | 2000-296724 | 10/2000 |
| JP | 2001-048034 | 2/2001 |
| JP | 2001-171497 | 6/2001 |
| JP | 2002-331850 | 11/2002 |

\* cited by examiner

DRIVING ASSIST SYSTEM FOR VEHICLE

BACKGROUND OF THE INVENTION

1. Field of the Invention

The present invention relates to a driving assist system for a vehicle which assists an operator to drive a vehicle, to a method thereof, and to a vehicle which is equipped with such a system.

2. Description of the Related Art

As a system which assists operation by an operator to drive a vehicle, there is known the one disclosed in Japanese Patent Laid Open Publication No. H 10-166889. This system is one which changes the actuation reaction force for the accelerator pedal based upon the distance between the vehicle in front and the subject vehicle which is detected by a vehicle distance detection device. For example, with this system, when the distance between vehicles is less than a predetermined value, an accelerator pedal actuation reaction force is added, in order to provide a warning to the operator.

SUMMARY OF THE INVENTION

However with the above described type of system, even if, for example, the operator is intentionally catching up with the preceding vehicle in order to overtake it, the reaction force for stepping down upon the accelerator pedal becomes great when the distance between vehicles drops below the predetermined value.

A vehicle driving assist system according to the present invention comprises a travel situation detection device that detects a vehicle condition and a traveling environment around a subject vehicle; a risk potential calculation device that calculates a risk potential around the subject vehicle based upon detection results of the traveling situation detection device; an accelerator pedal reaction force calculation device that calculates an accelerator pedal reaction force command value based upon the risk potential which is calculated by the risk potential calculation device; an accelerator pedal reaction force generation device that generates an actuation reaction force for an accelerator pedal, according to the accelerator pedal reaction force command value which is calculated by the accelerator pedal reaction force calculation device; a driving intention detection device that detects a driving intention of an operator of the subject vehicle; and an accelerator pedal reaction force modification device that adjusts the actuation reaction force to be generated for the accelerator pedal, based upon a detection result of the driving intention detection device.

A vehicle driving assist system according to the present invention comprises a travel situation detection means for detecting a vehicle condition and a traveling environment around a subject vehicle; a risk potential calculation means for calculating a risk potential around the subject vehicle based upon detection results of the traveling situation detection means; an accelerator pedal reaction force calculation means for calculating an accelerator pedal reaction force command value based upon the risk potential which is calculated by the risk potential calculation means; an accelerator pedal reaction force generation means for generating an actuation reaction force for an accelerator pedal, according to the accelerator pedal reaction force command value which is calculated by the accelerator pedal reaction force calculation means; a driving intention detection means for detecting a driving intention of an operator of the subject vehicle; and an accelerator pedal reaction force modification means for adjusting the actuation reaction force to be generated for the accelerator pedal, based upon a detection result of the driving intention detection means.

A vehicle driving assist method according to the present invention detects a vehicle condition and a traveling environment around a subject vehicle; calculates a risk potential around the subject vehicle based upon the vehicle condition and the traveling environment around the subject vehicle; calculates an accelerator pedal reaction force command value based upon the risk potential; generates an actuation reaction force for an accelerator pedal, according to the accelerator pedal reaction force command value; detects a driving intention of an operator of the subject vehicle; and adjusts the actuation reaction force to be generated for the accelerator pedal, based upon the driving intention of the operator.

A vehicle according to the present invention comprises a travel situation detection device that detects a vehicle condition and a traveling environment around a subject vehicle; a risk potential calculation device that calculates a risk potential around the subject vehicle based upon detection results of the traveling situation detection device; an accelerator pedal reaction force calculation device that calculates an accelerator pedal reaction force command value based upon the risk potential which is calculated by the risk potential calculation device; an accelerator pedal reaction force generation device that generates an actuation reaction force for an accelerator pedal, according to the accelerator pedal reaction force command value which is calculated by the accelerator pedal reaction force calculation device; a driving intention detection device that detects a driving intention of an operator of the subject vehicle; and an accelerator pedal reaction force modification device that adjusts the actuation reaction force to be generated for the accelerator pedal, based upon a detection result of the driving intention detection device.

DESCRIPTION OF THE PREFERRED EMBODIMENTS

First Embodiment

Figure 1:
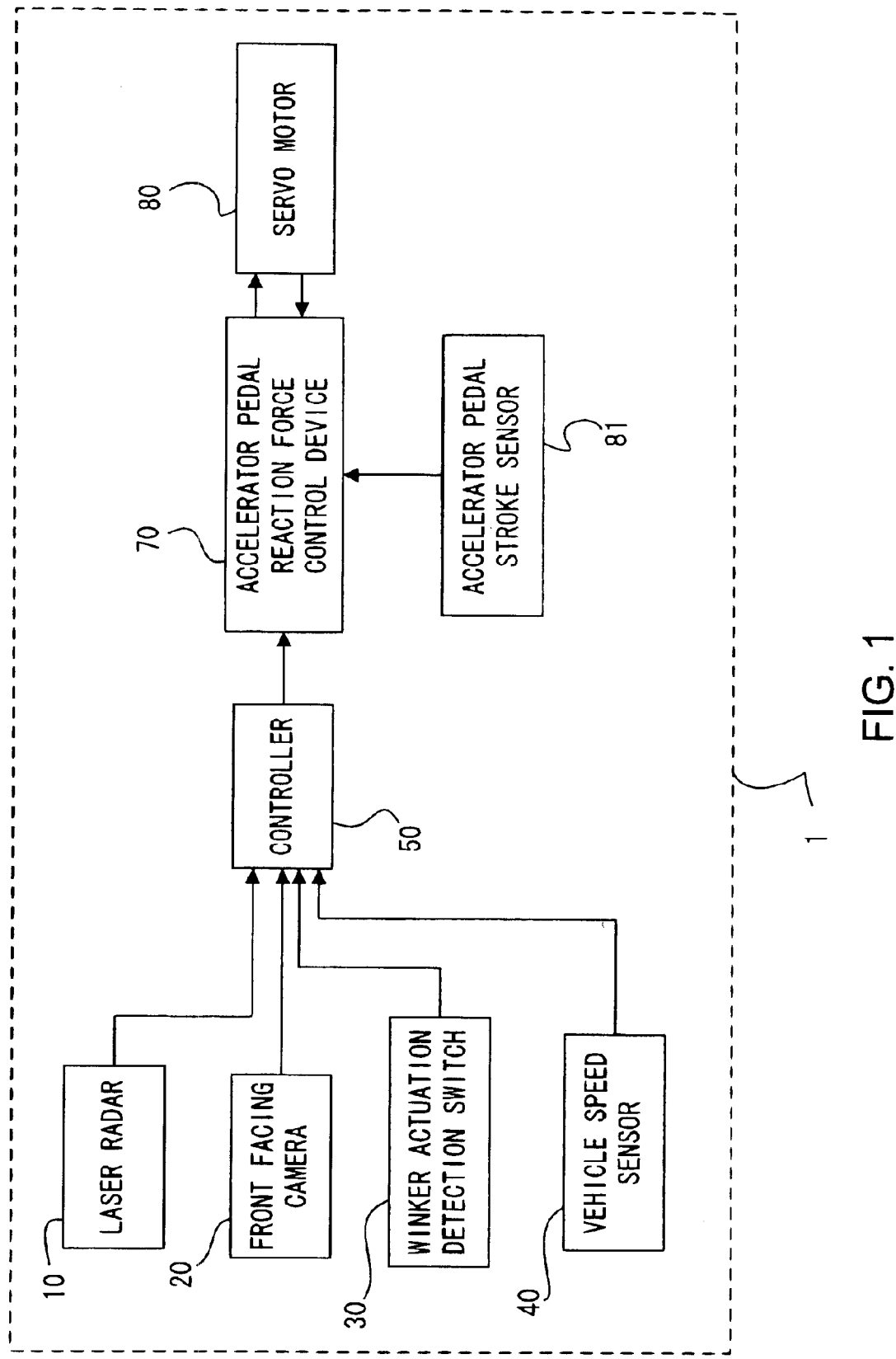
FIG. 1 is a block diagram showing the structure of a driving assist system for a vehicle according to a first preferred embodiment of the present invention.
Figure 2:
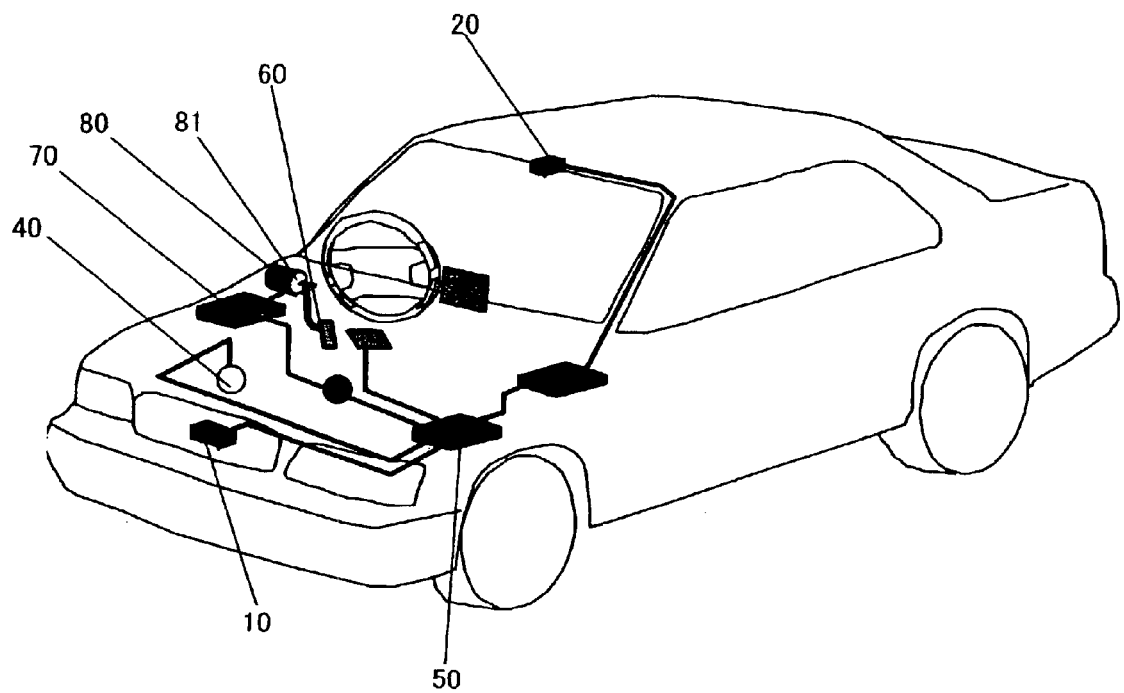
FIG. 2 is a structural diagram of a vehicle to which this driving assist system according to the first preferred embodiment is fitted.

FIG. 1 is a block diagram showing the structure of a driving assist system 1 for a vehicle according to the first preferred embodiment of the present invention, while FIG. 2 is a structural diagram of a vehicle to which this driving assist system 1 is fitted.

First, the structure of this vehicle driving assist system 1 will be explained.

A laser radar 10 is mounted to a front grille of the vehicle. Such a laser radar 10 is of a type which can scan horizontally and laterally about 6 degrees to each side of an axis parallel to the vehicle longitudinal centerline, propagates infrared pulses forward, and receives the radiation reflected by an obstacle, such as a rear bumper of a vehicle in front of the subject vehicle. This laser radar 10 provides the vehicle separation or distance, and the relative velocity or speed between the subject vehicle and the preceding vehicle. Such a laser radar 10 outputs the vehicle distance and the relative speed between the subject vehicle and the preceding vehicle which have been detected to a controller 50.

A vehicle speed sensor 40 detects the traveling speed of the subject vehicle from the rotational speed of a wheel thereof or the like, and outputs a signal representative thereof to the controller 50.

A front facing camera 20 is a compact CCD camera or a CMOS camera or the like which is mounted to an upper portion of windscreen of the subject vehicle, and it captures an image forward of the subject vehicle to detect the road situation ahead of the subject vehicle. The region which can be detected by this front facing camera 20 is a horizontal region about 30 degrees to either side of the center line of the subject vehicle, and the landscape of the road ahead of the subject vehicle which is included in this region is taken as an image. This front facing camera 20 outputs the image of the road ahead of the subject vehicle which it has detected to the controller 50.

A winker actuation detection switch 30 detects actuation state of winkers or direction indicators by the operator, and this switch 30 outputs a detection signal to the controller 50. The winker actuation detection switch 30 may, for example, output an ON signal when the winkers are being actuated to be ON, and may output an OFF signal when the winkers are not being actuated or turned back to its neutral position.

The controller 50 performs overall control of the entire vehicle driving assist system 1. The controller 50 of this first preferred embodiment performs accelerator pedal reaction force control for generating an accelerator pedal reaction force which corresponds to a risk potential RP of the surroundings of the subject vehicle according to the traveling situation of the subject vehicle. Furthermore, the controller 50 adjusts this actuation reaction force which is to be generated for an accelerator pedal 60 based upon the driving intention of the operator. The controller 50 determines the accelerator pedal reaction force which is to be generated for the accelerator pedal 60 based upon the risk potential in the surroundings of the subject vehicle and upon the driving intention of the operator, and outputs a command to an accelerator pedal reaction force control device (a AF control device) 70 so as to control this accelerator pedal reaction force.

This AF control device 70 controls a servo motor 80 so as to implement the accelerator pedal reaction force which has been calculated, according to the command from the controller 50. And the servo motor 80 controls the torque and the rotational angle which it generates according to the signal from the AF control device 70, so as to control the actuation reaction force which is generated for the accelerator pedal as desired.

Figure 3:
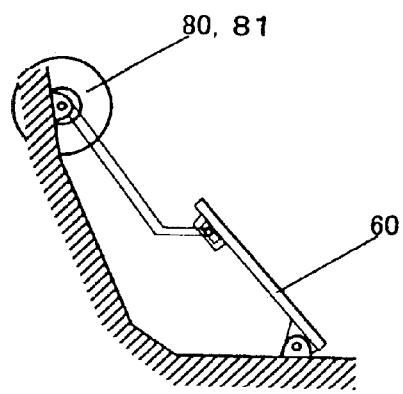
FIG. 3 is a figure showing structures in the neighborhood of an accelerator pedal.

FIG. 3 shows the structures in the neighborhood of the accelerator pedal 60. As shown in FIG. 3, the servo motor 80 and an accelerator pedal stroke sensor 81 are connected to the accelerator pedal 60 via a link mechanism. This accelerator pedal stroke sensor 81 detects the amount S of actuation of the accelerator pedal 60 which has been converted into a rotational angle of the servo motor 80 via the link mechanism. And this accelerator pedal stroke sensor 81 outputs the accelerator pedal actuation amount S which has been detected to the AF control device 70.

When the accelerator pedal reaction force control according to the risk potential RP in the surroundings of the subject vehicle is not being performed, for example, the accelerator pedal reaction force F may be set so as to increase linearly along with increase of the accelerator pedal actuation amount S. The characteristic function of the accelerator pedal reaction force F with respect to the accelerator pedal actuation amount S when, in this manner, the accelerator pedal reaction force control is not being performed, is taken as being the normal reaction force characteristic. It should be understood that this normal reaction force characteristic may be implemented by the spring force of a torsion spring (not shown in the figures) which is provided, for example, at the rotational axis of the accelerator pedal 60.

Figure 4:
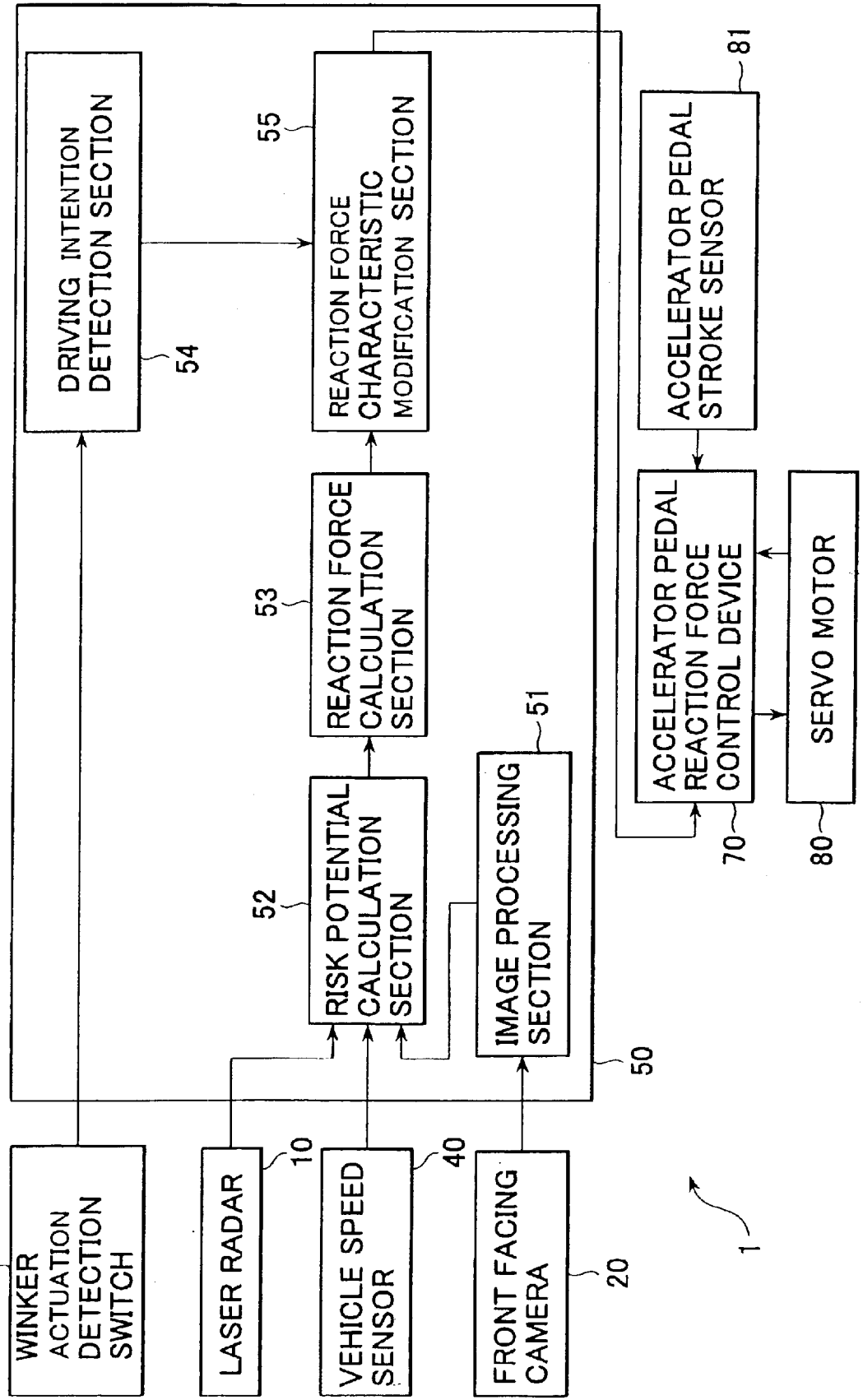
FIG. 4 is a block diagram showing the interior of a controller which is incorporated in this first preferred embodiment, and structures in its neighborhood.

FIG. 4 is a block diagram showing the interior of the controller 50 of this vehicle driving assist system 1, and various structures in its neighborhood. The controller 50 comprises a CPU and CPU peripheral components such as a ROM, a RAM and the like. The controller 50 constitutes an image processing section 51, a risk potential calculation section 52, a reaction force calculation section 53, a driving intention detection section 54, and a reaction force characteristic modification section 55 in the form of software in CPU.

The image processing section 51 performs various types of image processing such as filter processing and recognition processing and the like upon the image of the scene in front of the subject vehicle which has been inputted from the front facing camera 20. And this image processing section 51 then outputs the image signal upon which this appropriate processing has been performed to the risk potential calculation section 52. It should be understood that the image processing section 51 may be provided independently from the controller 50.

The risk potential calculation section 52 calculates the risk potential RP attributable to the surrounding environment of the subject vehicle, based upon the signals which are inputted from the laser radar 10, the vehicle speed sensor 40, and the image processing section 51. And this risk potential calculation section 52 outputs the risk potential RP which it has calculated to the reaction force calculation section 53.

The reaction force calculation section 53 calculates an increase amount ΔF for the pedal reaction force which is to be generated for the accelerator pedal 60, based upon the risk potential RP which has been calculated by the risk potential calculation section 52. And this reaction force calculation section 53 calculates the accelerator pedal reaction force F which is to be generated for the accelerator pedal 60 from the reaction force increase amount ΔF which has thus been calculated, and the normal reaction force characteristic corresponding to the accelerator pedal actuation amount S.

The driving intention detection section 54 detects various trends of the driving intention on the part of the operator of the vehicle, such as the intention to change the vehicle lane in which the subject vehicle is traveling to a neighboring vehicle lane, and the intention to overtake the vehicle in front, and the like. And this driving intention detection section 54 detects the actuation state of the winkers based upon the signal from the winker actuation detection switch 30. When the winkers are actuated to be ON, the driving intention detection section 54 decides that the operator intends to change the vehicle lane or to overtake the vehicle in front or the like. The driving intention detection section 54 outputs a signal regarding the driving intention on the part of the operator which it has detected—in this case, the ON/OFF signal denoting winker actuation—to the reaction force characteristic modification section 55.

The reaction force characteristic modification section 55 alters the characteristic of the accelerator pedal reaction force F with respect to the risk potential RP, based upon the signal which has been inputted from the driving intention detection section 54. This alteration of the reaction force characteristic which is performed by the reaction force characteristic modification section 55 will be explained hereinafter.

Next, the operation of this vehicle driving assist system 1 according to the first preferred embodiment of the present invention will be explained.

The risk potential calculation section 52 reads in the vehicle distance D and the relative speed Vr to the preceding vehicle, and the traveling speed Vf of the subject vehicle from the laser radar 10, the vehicle speed sensor 40, and the image processing section 51 and recognizes the traveling situation around the subject vehicle. And, in order to calculate the risk potential RP of the surroundings of the subject vehicle, the risk potential calculation section 52 first, based upon the vehicle traveling situation which has been recognized, calculates a current degree of proximity to the preceding vehicle, and a degree of influence (a degree of predicted influence) upon the subject vehicle due to the possible future movement of the preceding vehicle. And then, the risk potential section 52 predicts or calculates the risk potential RP for the vehicle traveling situation in the future from the degree of proximity and the degree of predicted influence which have thus been calculated.

Here, a time to contact (TTC) is calculated as the degree of proximity to the preceding vehicle, and a time headway (THW) is calculated as the degree of predicted influence.

This TTC is a value which indicates after how many seconds the vehicle distance D will become zero and the subject vehicle and the preceding vehicle will come into mutual contact, if the present vehicle traveling situation is maintained, in other words if the subject vehicle speed Vf, the preceding vehicle speed Va, and the relative speed Vr remain constant. TTC is obtained according to the following Equation (1) (it should be noted that the relative speed Vr=Vf−Va):

$$TTC = D/Vr \qquad \text{(Equation 1)}$$

TTC is a physical quantity that gives the current degree of proximity of the subject vehicle with respect to the preceding vehicle. The smaller is the absolute value of TTC, the greater the degree of proximity to the preceding vehicle, and this indicates more tens situation with possible contact between the subject vehicle and the preceding vehicle. For example, when the subject vehicle approaches towards the preceding vehicle, it is known that almost every operator will have started to perform deceleration operation before TTC becomes less than 4 seconds.

THW is a physical quantity which expresses the degree of influence upon TTC due to future change of the preceding vehicle speed which may be supposed while the subject vehicle is tracking the preceding vehicle. In other words, THW expresses the degree of influence upon TTC when it is supposed that the relative speed Vr changes. THW may be calculated using the following Equation (2):

$$THW = D/Vf \qquad \text{(Equation 2)}$$

THW is given by dividing the vehicle distance D by the speed Vf of the subject vehicle, and it represents the time period until the subject vehicle arrives at the current position of the preceding vehicle. The greater is THW, the smaller does the degree of predicted influence with respect to changes of the surrounding environment of the subject vehicle become. In other words, if THW is great, even if in the future the preceding vehicle speed changes, this will not exert a great influence upon the degree of proximity of the subject vehicle to the preceding vehicle, so that TTC will not exhibit any great change.

It should be understood that, if the subject vehicle is traveling so as to follow after the preceding vehicle at the subject vehicle speed Vf equal to the preceding vehicle speed Va, accordingly, it would also be possible to use the preceding vehicle speed Va, instead of the subject vehicle speed Vf in Equation (2).

The risk potential calculation section 52 calculates the risk potential RP using the following Equation (3), based upon TTC and THW:

$$RP = a/THW + b/TTC \qquad \text{(Equation 3)}$$

Here, a and b are respective parameters for appropriately weighting the degree of proximity and the degree of predicted influence, and they are suitably set in advance with a<b. It is desirable for the values of a and b to be, for example, estimated from statistics relating to THW and TTC, and they may be set to values around a=1 and b=8.

As shown by Equation (3), the risk potential RP is a physical quantity which is given continuously as the sum of the reciprocal (1/TTC) of TTC and the reciprocal (1/THW) of THW, appropriately weighted.

Figure 5:
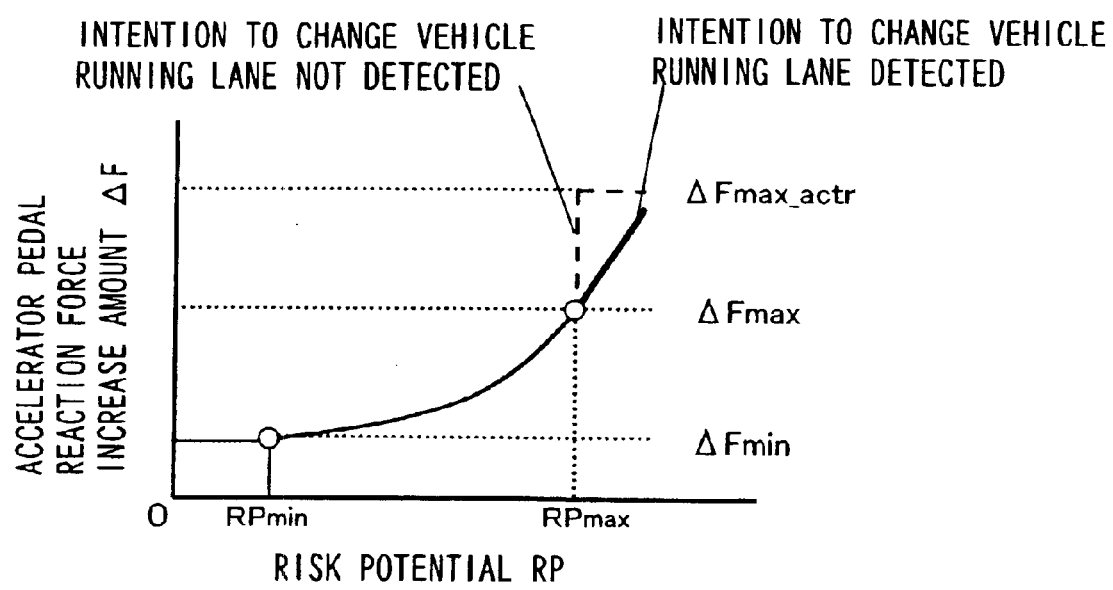
FIG. 5 is a figure showing a characteristic of reaction force increase amount with respect to risk potential, in this first preferred embodiment.

The reaction force calculation section 53 calculates a reaction force increase amount ΔF according to the risk potential RP which has been calculated by the risk potential calculation section 52. FIG. 5 shows an example of the characteristic of the reaction force increase amount ΔF with respect to the risk potential RP, in this first preferred embodiment. As shown in FIG. 5, the greater is the risk potential RP, the greater is the reaction force increase amount ΔF. The reaction force calculation section 53 calculates the reaction force increase amount ΔF according to the characteristic shown in FIG. 5, and calculates an accelerator pedal reaction force F which is to be generated for the accelerator pedal 60 by adding this reaction force increase amount ΔF to the normal reaction force characteristic.

As shown in FIG. 5, if the risk potential RP is less than a minimum value RPmin, the reaction force increase amount ΔF is taken to be zero. If the predicted risk potential RP in the future is extremely small, there is a possibility of imposing a nuisance upon the operator if the accelerator pedal reaction force is increased in order to transmit the risk potential RP to him. Thus, the minimum risk potential RPmin which generates an accelerator pedal reaction force increase amount ΔF is set appropriately in advance, in order not to impose such a nuisance upon the operator. Furthermore, a maximum risk potential RPmax is also set in advance (with RPmin<RPmax). This maximum risk potential RPmax is a value of the risk potential RP at which it is considered to be desirable for the operator to remove his foot from the accelerator pedal 60 because the risk potential RP for the future is predicted to be high.

In correspondence to the minimum risk potential RPmin, a minimum reaction force value ΔFmin (a so termed first reaction force command value) is set at which the operator can perceive increase of the accelerator pedal reaction force F, allowing for differences between individuals. In the same manner, in correspondence to the maximum risk potential RPmax, a maximum reaction force value ΔFmax (a so termed second reaction force command value) is set at which the operator can reliably perceive increase of the accelerator pedal reaction force F, again allowing for differences between individuals.

In this manner, at the minimum risk potential RPmin the minimum reaction force value ΔFmin is added to the accelerator pedal reaction force, while at the maximum risk potential RPmax the maximum reaction force value ΔFmax is added. Due to this, it is possible for the operator reliably to recognize the risk potential RP from increase of the accelerator pedal reaction force F.

As shown in FIG. 5, between the minimum risk potential RPmin and the maximum risk potential RPmax, the accelerator pedal reaction force increase amount ΔF increases according to an exponential function from its minimum value ΔFmin to its maximum value ΔFmax. This is shown by the following Equation (4):

$$\Delta F = k \cdot RP^n \qquad \text{(Equation 4)}$$

Here, k and n are constants.

In this manner, using Equation (4), the accelerator pedal reaction force increase amount ΔF is continuously set as the risk potential RP changes. By doing this, it becomes possible for change of the risk potential RP to be continuously communicated to the operator by increase of the accelerator pedal reaction force F. It should be understood that the constants k and n will each be set differently for different types of vehicle or the like. For example the constants k and n may be set appropriately based upon results from a drive simulator or from on-the-road experiments, so as to convert the risk potential RP into the accelerator pedal reaction force F as a value which conforms to the sense impressions which are actually experienced by an operator.

Furthermore, as shown by the broken line in FIG. 5, when the risk potential RP exceeds the maximum value RPmax, the reaction force increase amount ΔF is increased in a discontinuous manner in one jump to a reaction force upper limit value ΔFmax_actr (a so termed third reaction force command value). By doing this, the operator receives the sense impression as if the accelerator pedal 60 is springing upward, so that it is possible for him easily to recognize that there is a strong requirement to release the accelerator pedal 60. Here, the characteristic shown by the broken line in FIG. 5 in which plotted are the minimum reaction force value ΔFmin, the maximum reaction force value ΔFmax, and the reaction force upper limit value ΔFmax_actr is taken as a first reaction force characteristic. It should be understood that, with this first reaction force characteristic, the range in which the risk potential RP is greater than the minimum value RPmin and also is less than the maximum value RPmax is shown by the solid line.

In this manner, the operator is enabled reliably to recognize the risk potential RP by the accelerator pedal reaction force F which is controlled according to the risk potential RP which is calculated based upon TTC and THW.

However, as shown by the first reaction force characteristic, if the reaction force increase amount ΔF increases in one jump up to the reaction force upper limit value ΔFmax_actr when the risk potential RP exceeds the maximum value ΔRPmax, there is a possibility of imposing a nuisance upon the operator, especially if the operator is intentionally approaching the preceding vehicle in order to change the vehicle lane or in order to overtake the preceding vehicle.

Thus, with the first preferred embodiment of the present invention, it is arranged to change or modify the accelerator pedal reaction force control which is performed when the risk potential RP exceeds the maximum value RPmax according to the driving intention on the part of the operator.

When a predetermined driving intention on the part of the operator is detected by the driving intention detection section 54, for example the intention to change the vehicle lane, the pedal reaction force characteristic modification section 55 adjusts or changes the accelerator pedal reaction force F which corresponds to the risk potential RP which has been calculated by the reaction force calculation section 53.

In concrete terms, if an intention on the part of the operator to change the vehicle lane has been detected, the reaction force increase amount ΔF is set using the above Equation (4) even in the region in which the risk potential RP exceeds its maximum value RPmax. In other words, when an intention on the part of the operator to change the vehicle lane is detected, even if the risk potential RP exceeds the maximum value RPmax, the reaction force increase amount ΔF is set continuously according to the risk potential RP, as shown by the solid line in FIG. 5. Thus, when an intention on the part of the operator to change the vehicle lane has been detected, the reaction force increase amount ΔF is not increased in one jump up to the reaction force upper limit value ΔFmax_actr when the risk potential RP exceeds the maximum value RPmax.

Figure 6A:
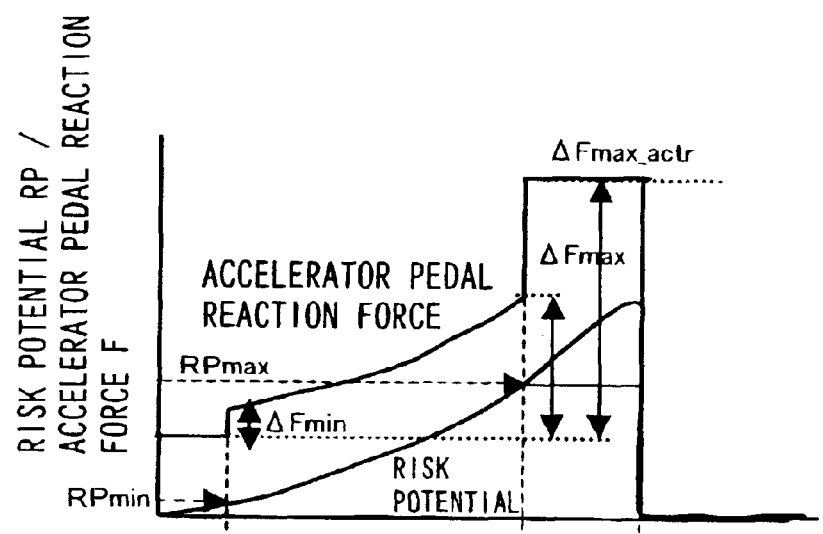
FIG. 6A is a figure showing change of risk potential and accelerator pedal reaction force with respect to time, when no intention on the part of the operator to change the vehicle lane has been detected.
Figure 6B:
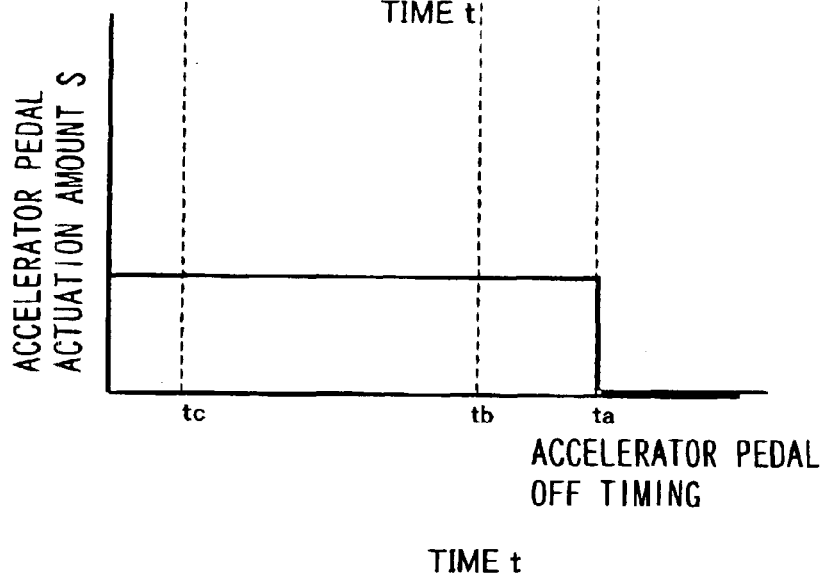
FIG. 6B is a figure showing change of accelerator pedal actuation amount with respect to time, when no intention on the part of the operator to change the vehicle lane has been detected.

FIG. 6A and FIG. 6B respectively show examples of the change of the risk potential RP and the accelerator pedal reaction force F with respect to time t, and of the change of the accelerator pedal actuation amount S with respect to time t, when no intention on the part of the operator to change the vehicle lane has been detected. And, similarly, FIG. 7A and FIG. 7B respectively show examples of the change of the risk potential RP and the accelerator pedal reaction force F with respect to time t, and of the change of the accelerator pedal actuation amount S with respect to time t, when an intention on the part of the operator to change the vehicle lane has been detected. Here, as shown in FIGS. 6B and 7B, by way of example, the explanation will be made in terms of the case in which the subject vehicle gradually approaches the preceding vehicle at a constant accelerator pedal actuation amount S.

Figure 7A:
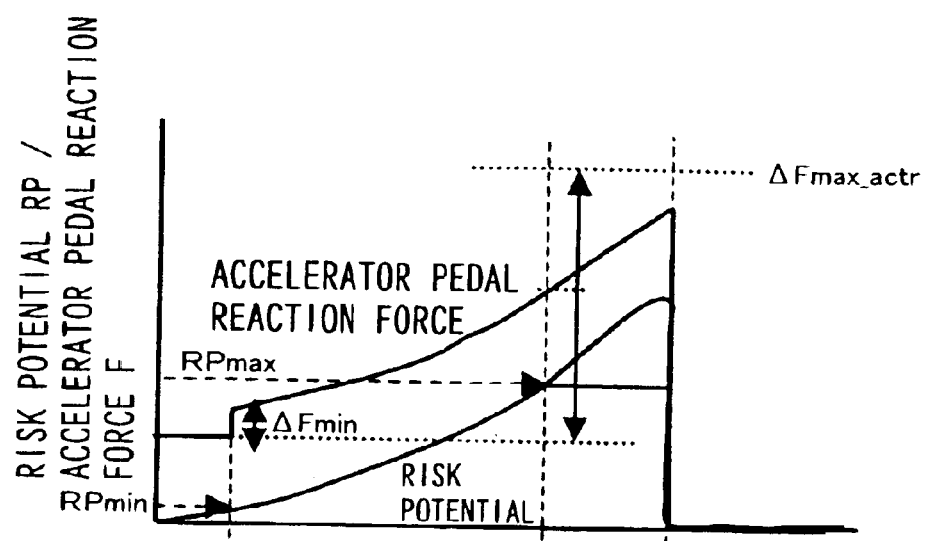
FIG. 7A is a figure showing change of risk potential and accelerator pedal reaction force with respect to time, when an intention on the part of the operator to change the vehicle lane has been detected.
Figure 7B:
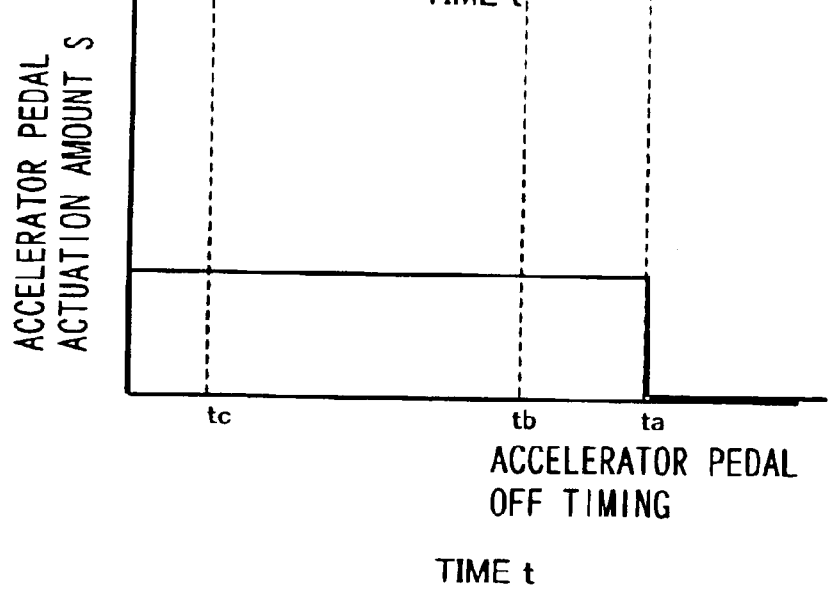
FIG. 7B is a figure showing change of accelerator pedal actuation amount with respect to time, when an intention on the part of the operator to change the vehicle lane has been detected.

As shown in FIGS. 6A and 7A, when the subject vehicle approaches the preceding vehicle, and when at the time point t=tc the risk potential RP increases to the minimum value RPmin, the accelerator pedal reaction force F increases by ΔFmin. After this, the accelerator pedal reaction force F increases along with increase of the risk potential RP.

If no intention on the part of the operator to change the vehicle lane is detected, then, as shown in FIG. 6A, when at the time point t=tb the risk potential RP exceeds the maximum value RPmax, the accelerator pedal reaction force F is increased in a discontinuous manner by the reaction force upper limit value ΔFmax_actr, with respect to the normal reaction force characteristic. In response to this increase of accelerator pedal reaction force F, the accelerator pedal 60 is released at the time point t=ta, and the risk potential RP and the accelerator pedal reaction force F drop to substantially zero.

On the other hand, if the intention on the part of the operator to change the vehicle lane is detected by the driving intention detection section 54, then, as shown in FIG. 7A, the accelerator pedal reaction force F is increased continuously, even from when the risk potential RP exceeds the maximum value RPmax at the time point t=tb. Since the accelerator pedal reaction force F is generated in correspondence to the risk potential RP, the operator is enabled to perform driving operation smoothly according to his original intention, while being able to recognize the risk potential RP. Furthermore, since the accelerator pedal reaction force F is not increased at a single jump, it is possible to avoid imposing the nuisance upon the operator of making it difficult for him to step down upon the accelerator pedal 60 due to increase of the accelerator pedal reaction force F, although in fact he wishes to accelerate in order, for instance, to overtake the vehicle in front.

Explanation has been given of the operation of the vehicle driving assist system 1 according to the first preferred embodiment of the present invention.

Figure 8:
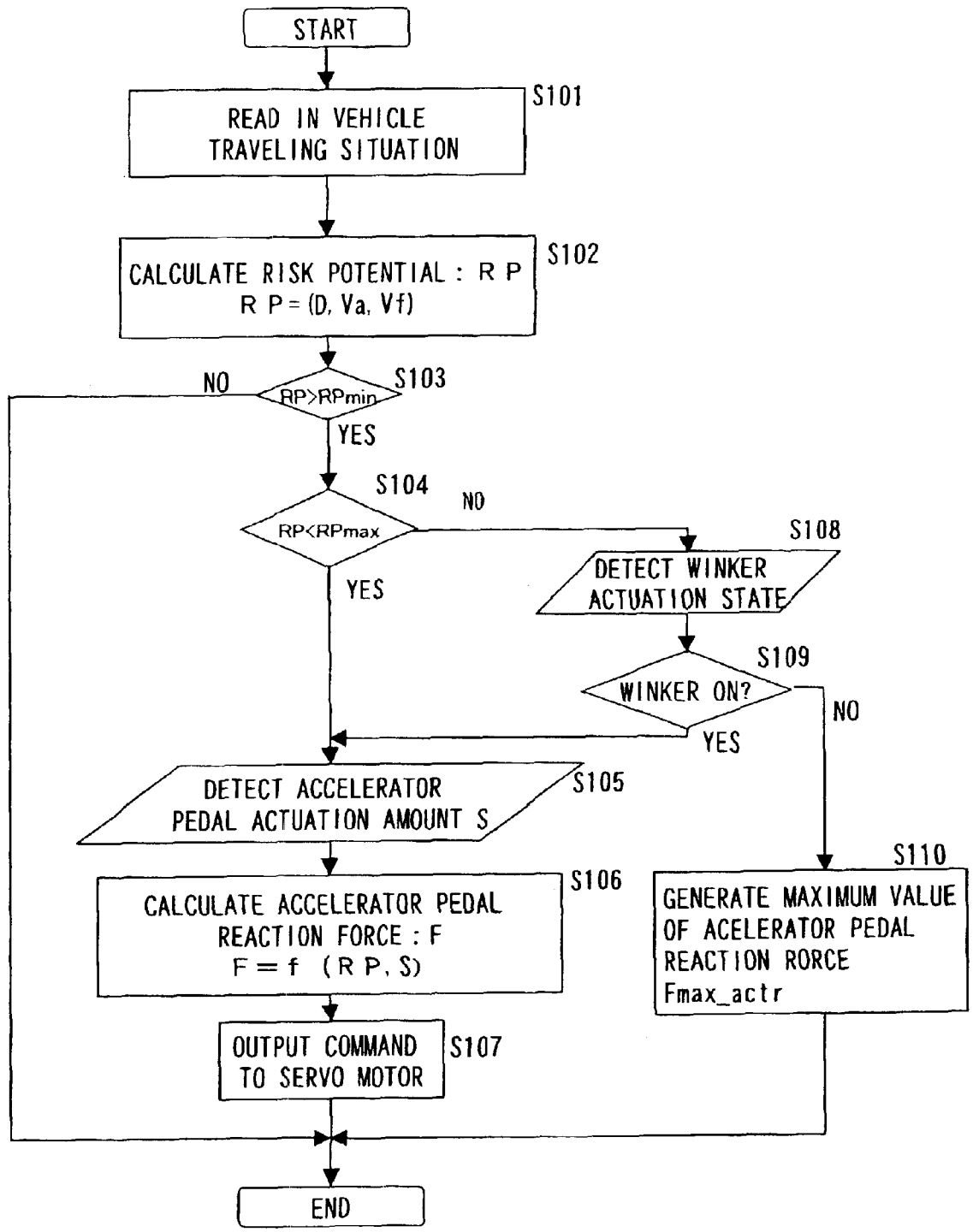
FIG. 8 is a flow chart showing the procedural flow of an accelerator pedal reaction force control program according to the first preferred embodiment of the present invention.

In the following, the procedural flow of the accelerator pedal reaction force control which was explained above will be explained using FIG. 8. FIG. 8 is a flow chart showing an example of a control program which is implemented by the controller 50 and the AF control device 70 according to this first preferred embodiment of the present invention. It should be understood that this procedure is performed repeatedly at time intervals of, for example 100 msec.

First, in the step S101, the traveling situation of the subject vehicle, in other words the vehicle condition and the traveling environment of the subject vehicle are read in. In concrete terms, the traveling situation, for example, the vehicle distance D, the relative speed Vr, the subject vehicle speed Vf, and the preceding vehicle speed Va as detected by the laser radar 10, the front facing camera 20, and the vehicle speed sensor 40, is read in. At this time, the image processing section 51 performs image processing upon the image signal which is inputted from the front facing camera 20.

Next in the step S102 the risk potential RP of the surroundings around the subject vehicle is calculated using the above described Equations (1) through (3), based upon the vehicle traveling situation which was read in in the step S101. And in the next step S103 a decision is made as to whether or not the risk potential RP which has been calculated in the step S102 is greater than the predetermined minimum value RPmin. If an affirmative decision is made in the step S103, then the flow of control proceeds to the step S104. In this step S104, a decision is made as to whether or not the risk potential RP is less than the predetermined maximum value RPmax.

If an affirmative decision is made in the step S104, then the flow of control proceeds to the step S105. In this step S105, the accelerator pedal actuation amount S which is detected by the accelerator pedal stroke sensor 81 is read in. In the next step S106, the reaction force increase amount ΔF is calculated by using the above described Equation (4), based upon the risk potential RP which has been calculated in the step S102. And the accelerator pedal reaction force F is calculated by adding the reaction force increase amount ΔF which has thus been calculated to the normal reaction force characteristic which corresponds to the accelerator pedal actuation amount S.

In the next step S107, a command is outputted to the servo motor 80 so as to generate the accelerator pedal reaction force F which has been calculated in the step S106, and thus the accelerator pedal reaction force F is controlled.

Figure 9:
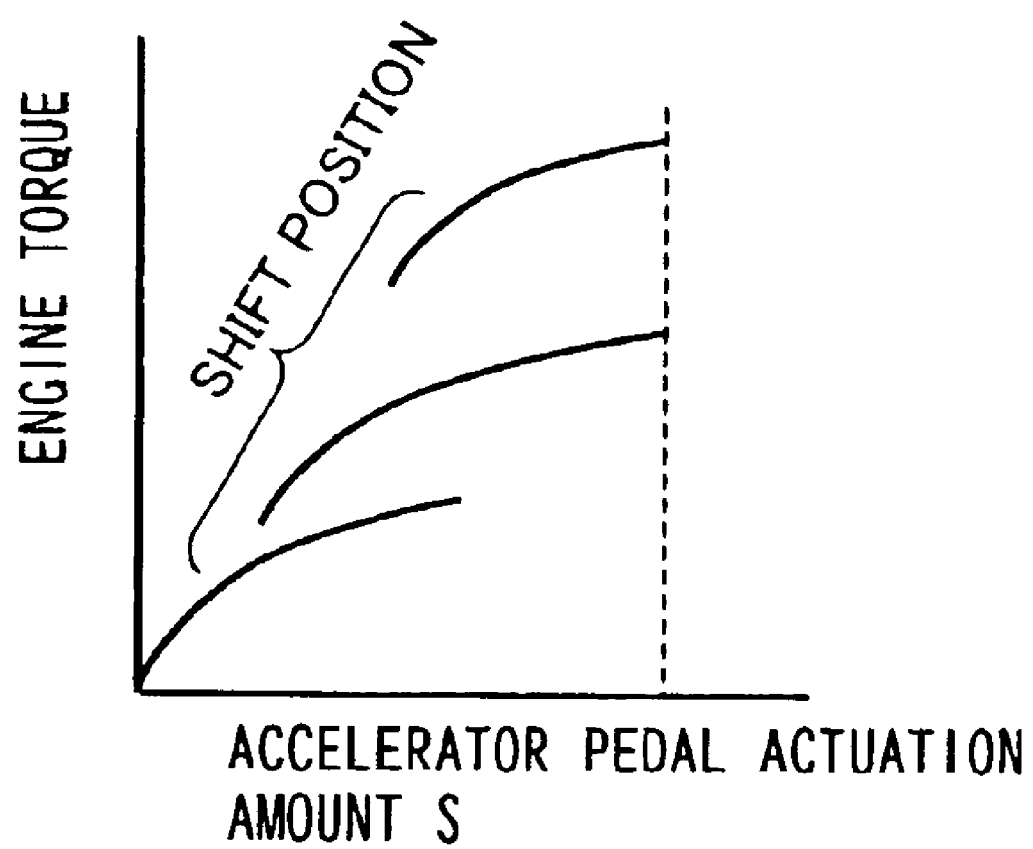
FIG. 9 is a figure showing a relationship between engine torque and accelerator pedal actuation amount.

The operator actuates the accelerator pedal 60 to adjust the drive force of the engine while recognizing the risk potential PR in the surroundings of the subject vehicle from the accelerator pedal reaction force F. It should be understood that, as shown in FIG. 9, the output torque of the engine is determined according to the accelerator pedal actuation amount S and according to the shift position of the gears of the vehicle.

If a negative decision is made in the step S104, so that the risk potential RP is greater than the maximum value RPmax, then the flow of control proceeds to the step S108. In this step S108, the actuation state of the winkers is detected, based upon the signal from the winker actuation detector 30. And in the next step S109, a decision is made as to whether or not the winkers are actuated to be ON.

If in this step S109 an affirmative decision is made so that it is decided that the winkers are actuated to be ON, then it is determined that an intention on the part of the operator to change the vehicle lane has been detected. In this case, the flow of control is transferred to the step S105 in order to set the accelerator pedal reaction force F according to the risk potential RP. In this manner, when an intention on the part of the operator to change the vehicle lane is detected, even when the risk potential RP exceeds the predetermined maximum value RPmax, the reaction force increase amount ΔF is calculated according to the risk potential RP, so as to control the accelerator pedal reaction force F.

On the other hand, if a negative decision is made in the step S109, so that no intention on the part of the operator to change the vehicle lane has been detected, then the flow of control is transferred to the step S110. In this step S110, a command is outputted to the servo motor 80 so as to increase the reaction force increase amount ΔF in one jump to the reaction force upper limit value ΔFmax_actr, so as to control the accelerator pedal reaction force F.

After the procedure in the step S107 or in the step S110, this episode of the procedure is completed. It should be understood that, if a negative decision is made in the step S103, the accelerator pedal reaction force control is not performed in this episode of the procedure.

In this way, with this first preferred embodiment of the present invention as explained above, the following advantages can be achieved.

(1) The controller 50 adjusts the accelerator pedal reaction force F which is generated for the accelerator pedal 60 based upon the result of detection by the driving detection section 54. In other words, when the predetermined driving intention on the part of the operator is detected, the controller 50 adjusts the accelerator pedal reaction force F so as not to hinder the driving behavior which is intended by the operator while generating the accelerator pedal reaction force F which corresponds to the risk potential RP of the surroundings of the subject vehicle. Due to this, it is possible to perform the accelerator pedal reaction force control according to the driving intention on the part of the operator, which is able to reduce the nuisance which may be imposed upon the operator.

(2) The controller 50 sets the accelerator pedal reaction force F based upon the risk potential RP of the surroundings of the subject vehicle and upon the driving intention on the part of the operator. In concrete terms, when the predetermined driving intention is detected by the driving intention detection section 54, the accelerator pedal reaction force characteristic (the RP-F characteristic) with respect to the risk potential RP is corrected or modified. By doing this, along with being possible to cause the operator to recognize the risk potential RP as an accelerator pedal reaction force F, it is also possible to perform the accelerator pedal reaction force control which is suited to his driving intention.

(3) When the predetermined driving intention is detected by the driving intention detection section 54, the accelerator pedal reaction force F is made to be smaller, as compared with the case in which no such predetermined driving intention is detected. In other words, if the predetermined driving intention has been detected, the accelerator pedal reaction force F is made to be smaller in order for the operator to perform accelerator pedal actuation more easily. By doing this, it is possible to perform the accelerator pedal reaction force control which is suited to the driving intention on the part of the operator so as to reduce the nuisance which may be imposed upon him.

(4) In the first reaction force characteristic with respect to the risk potential RP, the minimum risk potential RPmin corresponds to the first reaction force command value ΔFmin, and the maximum risk potential RPmax corresponds to the second reaction force command value ΔFmax. With this first reaction force characteristic, the greater the risk potential RP is between the minimum and the maximum risk potentials RPmin and RPmax, the more does the reaction force increase amount ΔF become. And, when the risk potential RP exceeds the maximum risk potential RPmax, the reaction force increase amount ΔF is set so as to increase in a discontinuous manner up to the third reaction force command value ΔFmax_actr which is greater than the second reaction force command value ΔFmax. When the predetermined driving intention on the part of the operator is detected, for example as shown in FIG. 5, the first reaction force characteristic is corrected or adjusted so that the reaction force increase amount ΔF becomes smaller than the third reaction force command value ΔFmax_actr when the risk potential RP is greater than the maximum risk potential RPmax. In other words, when the risk potential RP is greater than the maximum risk potential RPmax, the reaction force characteristic or RP-F characteristic is changed over according to the driving intention of the operator. By doing this, when the predetermined driving intention on the part of the operator is detected, no sense of incompatibility is imparted to the operator by the accelerator pedal reaction force F increasing in a discontinuous manner.

(5) Since the intention on the part of the operator to change the lane in which the vehicle is traveling is detected by the driving detection section 54, no nuisance is imposed upon the operator due to increase of the accelerator pedal reaction force F when, in particular, the operator cannot change the vehicle lane to the fact that another vehicle is present in a neighboring vehicle lane, irrespective of the operator intending to change the vehicle lane. Due to this, it is possible for the operator to perform driving operation which is suited to his intention.

(6) The driving intention detection section 54 detects the intention on the part of the operator to change the vehicle lane based upon the actuation state of the winkers which is detected by the winker actuation detector 30. Due to this, there is no requirement to provide any special separate device for detecting the intention on the part of the operator to change the vehicle lane, so that it is possible to reduce the cost of the system.

(7) The risk potential calculation section 52 calculates the time to contact TTC which represents the degree of proximity to the preceding vehicle based upon the subject vehicle speed Vf and the vehicle distance D, and calculates the time headway THW which represents the degree of influence upon the subject vehicle due to change in the behavior of the preceding vehicle based upon the relative vehicle speed Vr and the vehicle distance D. And the risk potential calculation section 52 calculates the risk potential RP using a function of THW and a function of TTC. By doing this, it is possible reliably to calculate the risk potential RP of the surroundings of the subject vehicle.

Second Embodiment

In the following, the driving assistance system for a vehicle according to the second preferred embodiment of the present invention will be explained. The physical structure of the vehicle driving assist system according to this second preferred embodiment is the same as that of the first preferred embodiment shown in FIGS. 1 and 2, and accordingly its description will be curtailed. Herein, the explanation will principally focus upon the points in which this second preferred embodiment differs from the first preferred embodiment.

Figure 10:
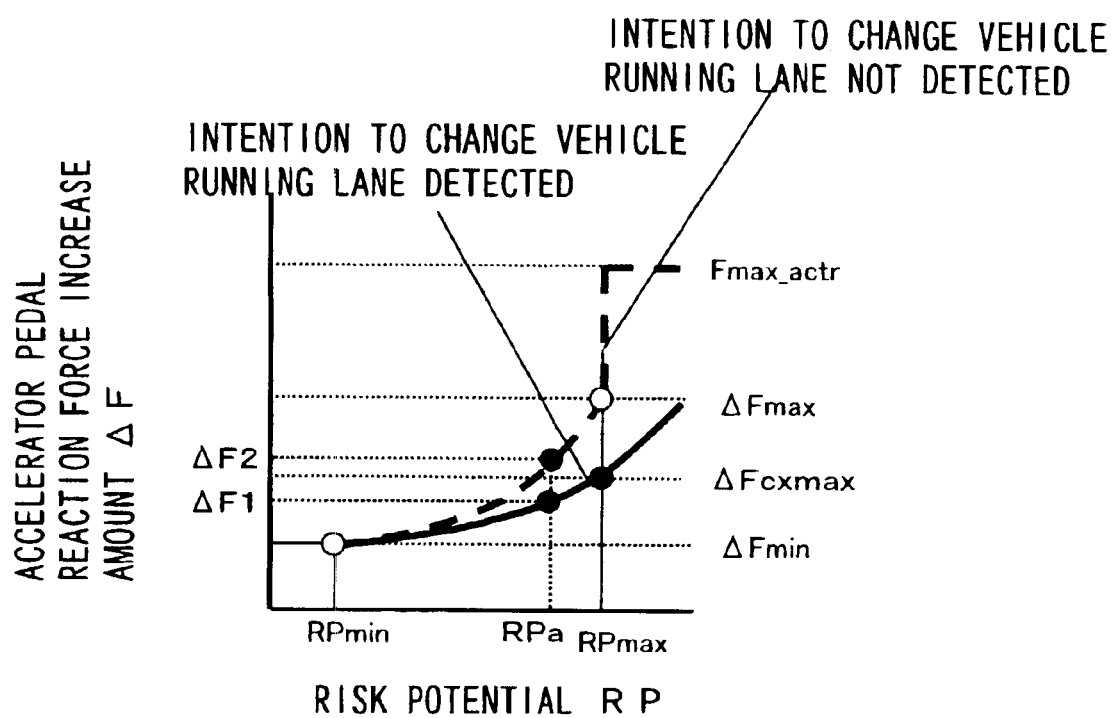
FIG. 10 is a figure showing a characteristic of reaction force increase amount with respect to risk potential, in a second preferred embodiment of the present invention.

FIG. 10 is a figure showing a characteristic of the reaction force increase amount ΔF with respect to the risk potential RP (RP-ΔF characteristic), in this second preferred embodiment of the present invention. In FIG. 10, the RP-ΔF characteristic when no intention on the part of the operator to change the vehicle lane is detected is shown by the broken line, while the RP-ΔF characteristic when an intention on the part of the operator to change the vehicle lane is detected is shown by the solid line. Here, the RP-ΔF characteristic as shown by the broken line in which plotted are a minimum reaction force value ΔFmin (a first reaction force command value) and a maximum reaction force value ΔFmax (a second reaction force command value) is taken as a second reaction force characteristic.

As shown in FIG. 10, if an intention on the part of the operator to change the lane in which the subject vehicle is traveling is detected, the ratio of change of the reaction force increase amount ΔF is made to be smaller, as compared with the case in which no intention to change the vehicle lane is detected. In other words, the reaction force increase amount ΔF is set so as to increase more gently with respect to increase of the risk potential RP. For example, for the same risk potential RPa (RPmin<RPa<RPmax), the reaction force increase amount ΔF1 when an intention to change the vehicle lane has been detected is set so as to be smaller than the reaction force increase amount ΔF2 when no intention to change the vehicle lane has been detected (i.e. ΔF1<ΔF2).

Furthermore, if an intention to change the vehicle traveling lane has been detected, even from when the risk potential RP exceeds the predetermined maximum value RPmax, a reaction force increase amount ΔF is generated which corresponds to the risk potential RP, without increasing the reaction force increase amount ΔF in a discontinuous manner to the reaction force upper limit value ΔFmax__actr. The upper limit of the reaction force increase amount ΔF when an intention to change the vehicle lane has been detected may, for example, be regulated to the reaction force increase amount maximum value ΔFmax which corresponds to the maximum risk potential RPmax when no intention to change the vehicle lane has been detected.

In the following, the setting of the reaction force increase amount ΔF with respect to the risk potential RP in this second preferred embodiment of the present invention will be explained.

With this second preferred embodiment, in the same manner as with the first preferred embodiment described above, the reaction force increase amount ΔF is calculated with respect to the risk potential RP using Equation (4). However, if an intention on the part of the operator to change the vehicle traveling lane has been detected, a constant c (where 0<c<1) is multiplied into the reaction force increase amount ΔF which is calculated using Equation (4), so as to adjust the reaction force increase amount ΔF.

The corrected value ΔFc of the reaction force increase amount ΔF may, for example, be obtained by the following Equation (5):

$$\Delta Fc = c \cdot k \cdot RP^n \qquad \text{(Equation 5)}$$

Figure 11A:
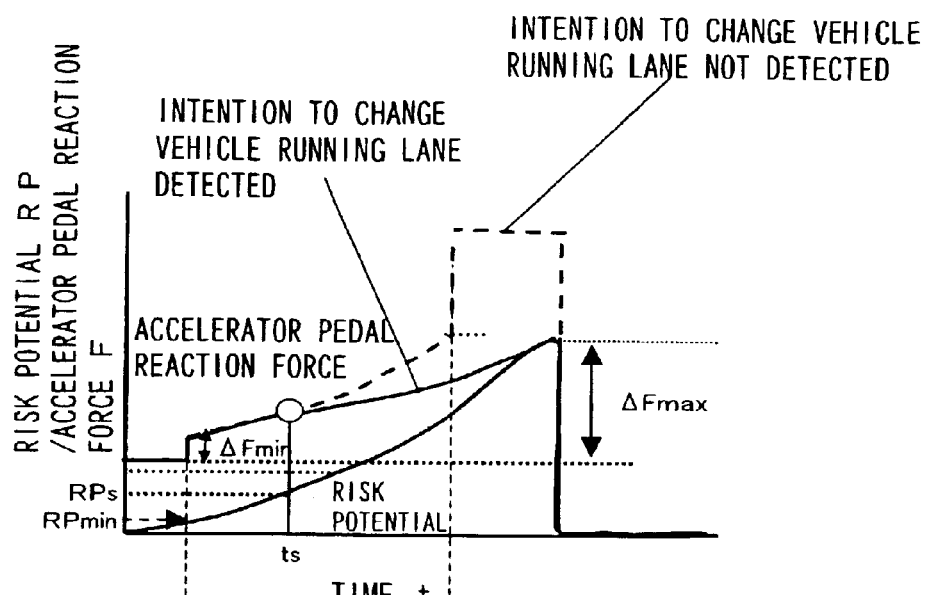
FIG. 11A is a figure showing change of risk potential and accelerator pedal reaction force with respect to time.
Figure 11B:
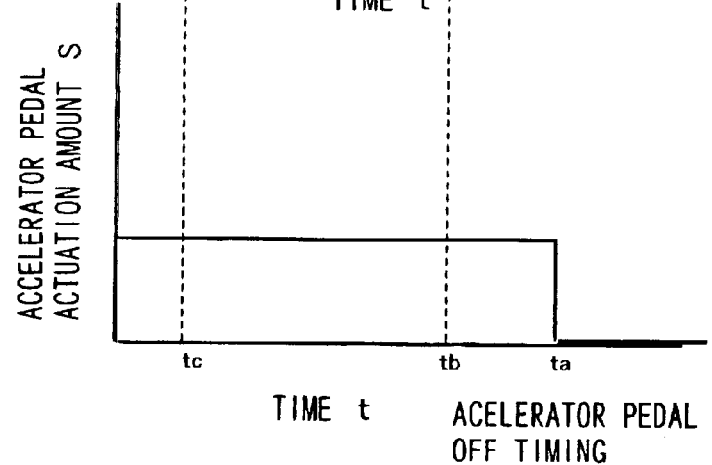
FIG. 11B is a figure showing change of accelerator pedal actuation amount with respect to time.

FIGS. 11A and 11B are figures showing examples of, respectively, change of the risk potential RP and the accelerator pedal reaction force F with respect to time t, and change of accelerator pedal actuation amount with respect to time t. Here, as shown in FIG. 11B, the explanation will be made in terms of an example in which the subject vehicle gradually approaches the preceding vehicle at a constant accelerator pedal actuation amount S. It should be understood that FIG. 11A shows the case in which the driving intention has been detected at the time point t=ts. In FIG. 11A, after the time point t=ts, the solid line shows the change of the accelerator pedal reaction force F when an intention on the part of the operator to change the vehicle lane has been detected, while the broken line shows the change of the accelerator pedal reaction force F when no such intention of the operator has been detected.

As shown in FIG. 11A, from the time point t=tc at which the risk potential RP increases to the minimum value RPmin, the accelerator pedal reaction force F increases as the risk potential RP becomes greater. Before the time point t=ts, the reaction force increase amount ΔF is calculated with respect to the risk potential RP using Equation (4).

If at the time point t=ts an intention on the part of the operator to change the vehicle lane is detected, then the corrected value ΔFc of the reaction force increase amount ΔF is calculated using Equation (5). And this corrected value ΔFc is added to the normal reaction force characteristic to obtain a corrected reaction force value Fc, which is generated as the accelerator pedal reaction force F. By doing this, the ratio of change of the reaction force increase amount ΔF with respect to increase of the risk potential RP is reduced, and accordingly the increase of the accelerator pedal reaction force F is made more gentle.

If an intention on the part of the operator to change the vehicle lane has been detected, then, as shown by the solid line in FIG. 11A, the corrected accelerator pedal reaction force F is generated according to the risk potential RP, until the accelerator pedal 60 is released and the accelerator pedal actuation amount S becomes substantially zero at the time point t=ta. As a result, the operator is able to perform driving operation smoothly according to his intentions, while recognizing the risk potential RP from the accelerator pedal reaction force F.

On the other hand, if no such intention on the part of the operator to change the vehicle lane has been detected, then as shown by the broken line in FIG. 11A the reaction force increase amount ΔF is increased gradually until the risk potential RP reaches the maximum value RPmax. When the risk potential RP exceeds the maximum value RPmax the reaction force increase amount ΔF is increased at a jump to the upper limit value ΔFmax__actr.

Figure 12:
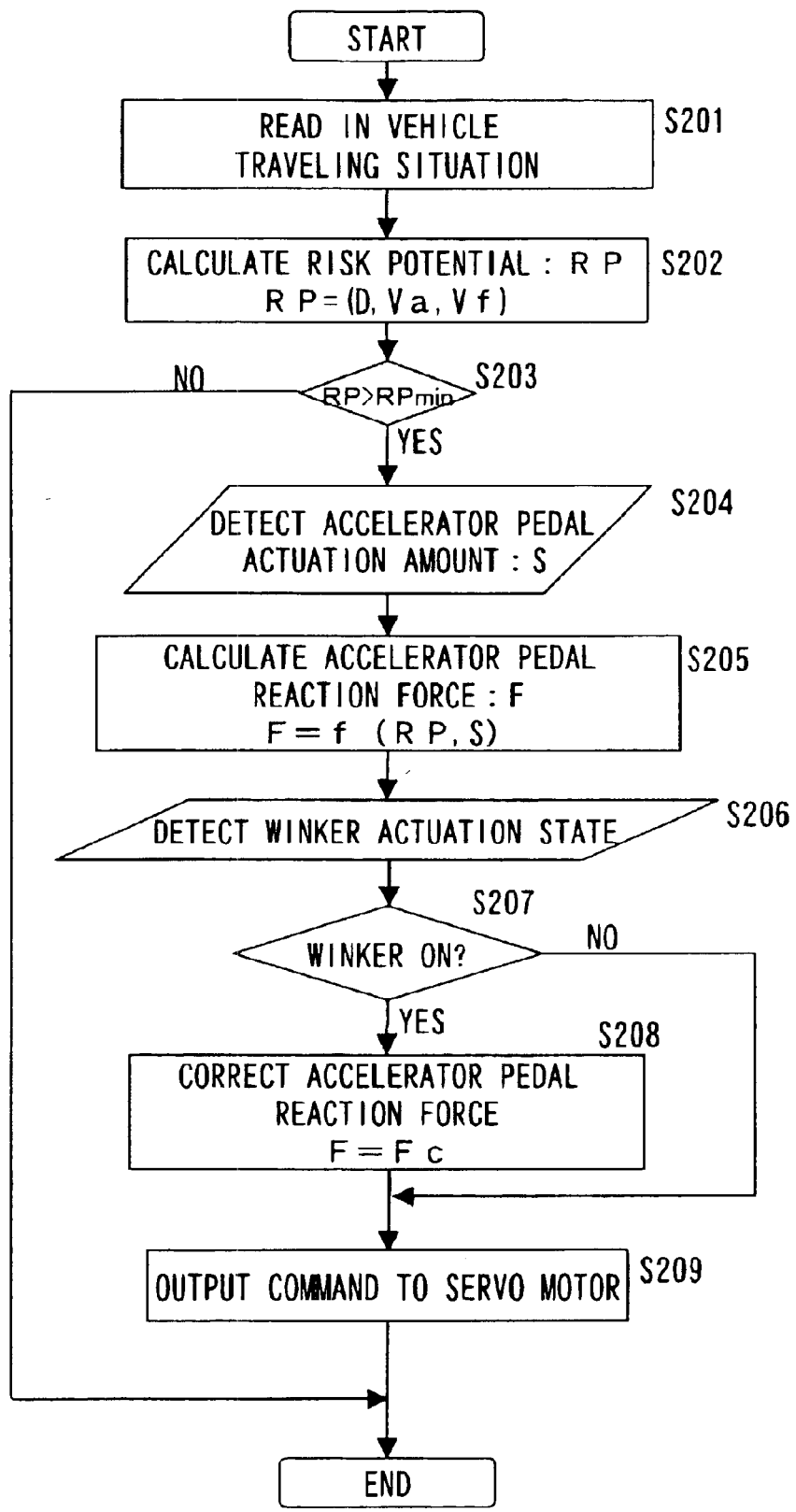
FIG. 12 is a flow chart showing the procedural flow of an accelerator pedal reaction force control program according to the second preferred embodiment of the present invention.

In the following, the procedural flow of the accelerator pedal reaction force control according to the second preferred embodiment of the present invention which was explained above will be explained using FIG. 12. FIG. 12 is a flow chart showing an example of a control program which is implemented by the controller 50 and the AF control device 70 according to this second preferred embodiment of the present invention. It should be understood that this procedure is performed repeatedly at time intervals of, for example 100 msec.

The processing in the steps S201 through S203 is the same as the processing in the steps S101 through S103 of the flow chart shown in FIG. 8 and described above in the first preferred embodiment of the present invention, and accordingly its explanation will be curtailed.

If an affirmative decision is made in the step S203 so that the risk potential RP which has been calculated in the step S202 is greater than the minimum value RPmin, then the flow of control proceeds to the step S204. In this step S204, the accelerator pedal actuation amount S which is detected by the accelerator pedal stroke sensor 81 is read in. In the next step S205, the reaction force increase amount ΔF is calculated using Equation (4), base upon the risk potential RP which has been calculated in the step S202. And the accelerator pedal reaction force F which is to be generated for the accelerator pedal 60 is calculated by adding this reaction force increase amount ΔF which has been calculated to the normal reaction force characteristic which corresponds to the accelerator pedal actuation amount S.

In the next step S206 the winker actuation state is detected, based upon the signal from the winker actuation detector 30. In the next step S207, a decision is made as to whether or not the winkers or blinkers are ON. If an affirmative decision is made in the step S207 so that the winkers are indeed actuated to be ON, in other words if it has been detected that the operator intends to change the lane in which the subject vehicle is traveling, then the flow of control proceeds to the step S208.

In this step S208, the accelerator pedal reaction force F which has been calculated in the step S205 is adjusted. In concrete terms, as shown in Equation (5), the corrected value ΔFc is calculated by multiplying the reaction force increase amount ΔF by the constant c, and the correct reaction force value Fc based upon this corrected value ΔFc is set as the actual accelerator pedal reaction force F.

On the other hand, if a negative decision is made in the step S207, in other words if no intention on the part of the operator to change the lane in which the subject vehicle is traveling is detected, then the flow of control is transferred directly to the step S209, so that the above correction of the accelerator pedal reaction force F is not performed.

In this step S209, a command is outputted to the servo motor 80 to cause it to generate the accelerator pedal reaction force F which has been calculated in the step S205 or in the step S208, and thereby the accelerator pedal reaction force control is performed.

It should be understood that the accelerator pedal reaction force F may be modified in the following manner if an intention on the part of the operator to change the vehicle lane has been detected.

For example, the accelerator pedal reaction force F which is calculated from the reaction force increase amount ΔF and the normal reaction force characteristic may be directly corrected. In concrete terms, the accelerator pedal reaction force F is calculated by adding the reaction force increase amount ΔF which is calculated using Equation (4) to the normal reaction force characteristic, and this accelerator pedal reaction force F may be adjusted by multiplying this accelerator pedal reaction force F by a constant d (where 0<d<1).

Alternatively, the constant k in Equation (4) for calculation of the reaction force increase amount ΔF may also be varied, according to whether an intention on the part of the operator to change the vehicle lane has been detected, or has not been detected. In this case, the constant k1 which is employed if an intention to change the vehicle lane has been detected should be set to be smaller than the constant k2 which is employed if no intention to change the vehicle lane has been detected (in other words, k1<k2). If an intention to change the vehicle lane has been detected, the reaction force increase amount ΔF is calculated using the constant k1. On the other hand, if no such intention to change the vehicle lane has been detected, the reaction force increase amount ΔF is calculated using the constant k2.

Yet further, as another alternative, it would also be possible to change the reaction force maximum value ΔFmax which corresponds to the maximum risk potential RPmax, according to whether an intention on the part of the operator to change the vehicle lane has been detected, or has not been detected. In other words, if an intention to change the vehicle lane has been detected, a reaction force increase amount ΔFcmax which is less than the maximum value ΔFmax when no intention to change the vehicle lane has been detected is set as the maximum value, and the reaction force increase amount ΔF is set so as to increase according to an exponential function between the minimum value ΔFmin and the maximum value ΔFcmax.

In this way, with this second preferred embodiment of the present invention as explained above, the following advantages can be achieved.

(1) If the predetermined driving intention has been detected by the driving intention detection section 54, then the reaction force characteristic or the RP-F characteristic is corrected so that the reaction force increase amount ΔF becomes smaller, as compared with the case when the predetermined driving intention has not been detected, even if the corresponding risk potential RP is the same. By doing this, it is possible to prevent imparting a sense of incompatibility to the operator due to performing the accelerator pedal reaction force control which is opposed to his intentions.

(2) In the second reaction force characteristic, the minimum risk potential RPmin corresponds to the first reaction force command value ΔFmin, and the maximum risk potential RPmax corresponds to the second reaction force command value ΔFmax. This second reaction force characteristic is set so that, between the minimum and the maximum risk potentials RPmin and RPmax, the greater is the risk potential RP, the greater does the reaction force increase amount ΔF become. When the predetermined driving intention is detected, as shown for example in FIG. 10, the second reaction force characteristic is modified so that the reaction force increase amount ΔF which corresponds to the maximum risk potential RPmax becomes a third reaction force command value ΔFcmax which is smaller than the second reaction force command value ΔFmax. By doing this, if the predetermined driving intention has been detected, the accelerator pedal reaction force F which is generated for the same risk potential RP becomes smaller, and thereby it is possible to reduce the possibility of imparting a sense of incompatibility to the operator.

Third Embodiment

In the following, the driving assist system for a vehicle according to the third preferred embodiment of the present invention will be explained.

Figure 13:
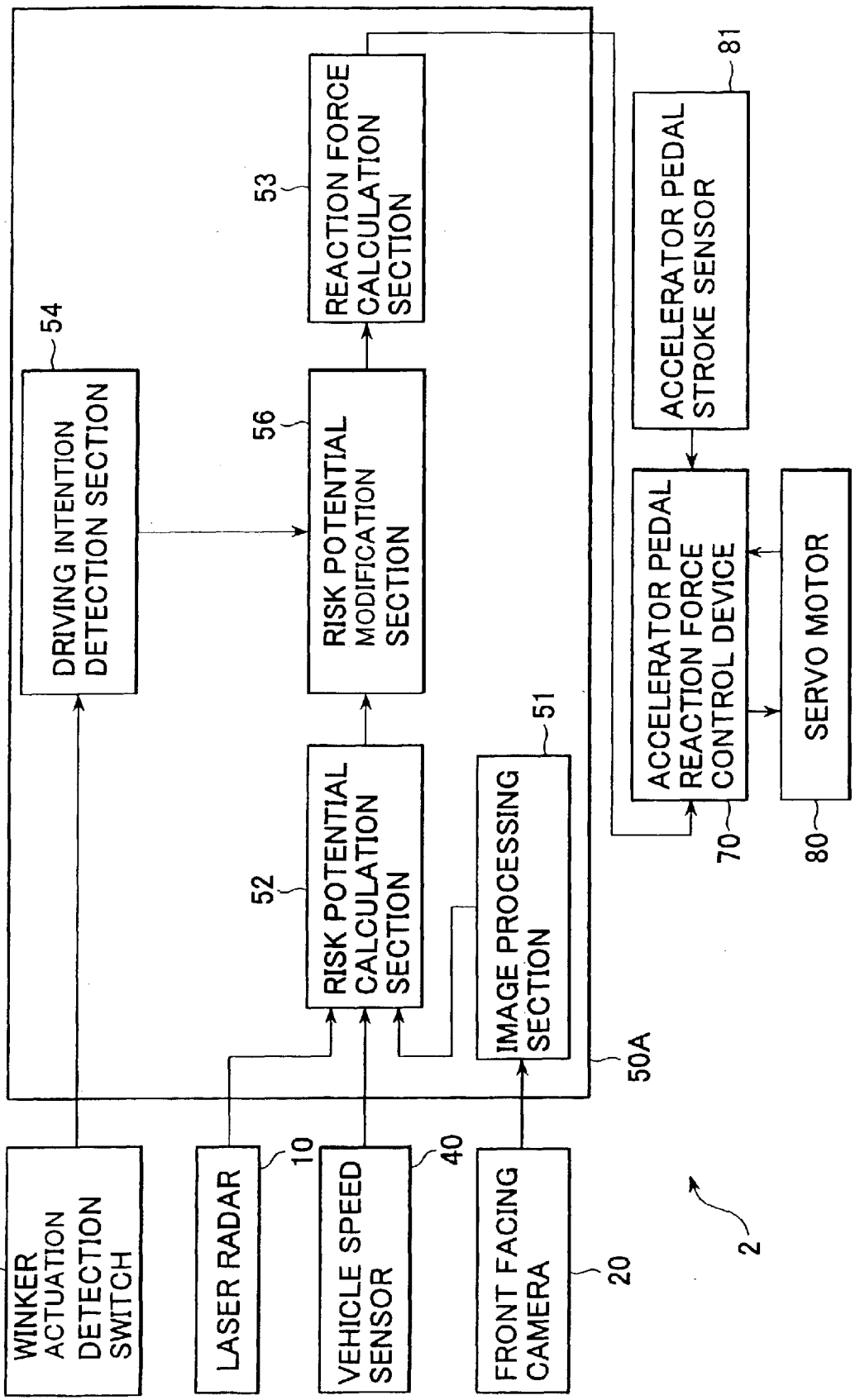
FIG. 13 is a figure showing the interior of a controller which is incorporated in a third preferred embodiment of the present invention, and structures in its neighborhood.

FIG. 13 is a figure showing the interior structure of a controller which is incorporated in this vehicle driving assist system 2 according to the third preferred embodiment of the present invention, and structures in its neighborhood. In FIG. 13, elements which correspond to elements of the first preferred embodiment shown in FIGS. 1 through 4 and described above are denoted by the same reference numerals, and their explanation will herein be curtailed. Here, the explanation will focus upon the point of difference between this third preferred embodiment and the first preferred embodiment.

As shown in FIG. 13, this vehicle driving assist system 2 according to the third preferred embodiment of the present invention comprises a risk potential modification section 56 which changes or modifies the risk potential RP according to the result of detection by the driving intention detection section 54.

If an intention on the part of the operator to change the vehicle traveling lane has been detected by the driving intention detection section 54, the risk potential modification section 56 performs correction so as to reduce the value of the risk potential RP which has been calculated by the risk potential calculation section 52.

If the subject vehicle is approaching towards the preceding vehicle, the risk which the operator actually feels is different when he has an intention to change the vehicle traveling lane or to perform overtaking, from when he has no such intention, even if TTC and THW are the same. In other words, if the operator is approaching the preceding vehicle intending to perform vehicle lane changing, he feels the risk around the subject vehicle to be lower, as compared with when he has no such intention to perform vehicle lane changing, since he is performing driving operation upon the premise that he is going to avoid the preceding vehicle. Here, in this third preferred embodiment of the present invention, the method which is used to calculate the risk potential RP is changed over according to whether an intention on the part of the operator to change the vehicle lane has been detected, or has not been detected in order to calculate the risk potential RP which is suited to the risk perceived by the operator.

The risk potential calculation section 52 calculates the risk potential RP using Equation (3) as described above. When an intention on the part of the operator to change the vehicle lane has been detected, the risk potential modification section 56 multiplies a constant kp into the risk potential RP which has been calculated by the risk potential calculation section 52 using Equation (3), so as to calculate the corrected value RPc of the risk potential RP. This corrected value RPc is given by Equation (6) below:

$$RPc = kp \cdot RP \quad \text{(Equation 6)}$$
$$= kp \cdot (a/THW + b/TTC)$$

Here kp is a constant satisfying 0<kp<1.

If the predetermined driving intention on the part of the operator has been detected, the reaction force calculation section 53 calculates the reaction force increase amount ΔF based upon the corrected risk potential value RPc which has been calculated by the risk potential modification section 56, and then calculates the accelerator pedal reaction force F.

Figure 14:
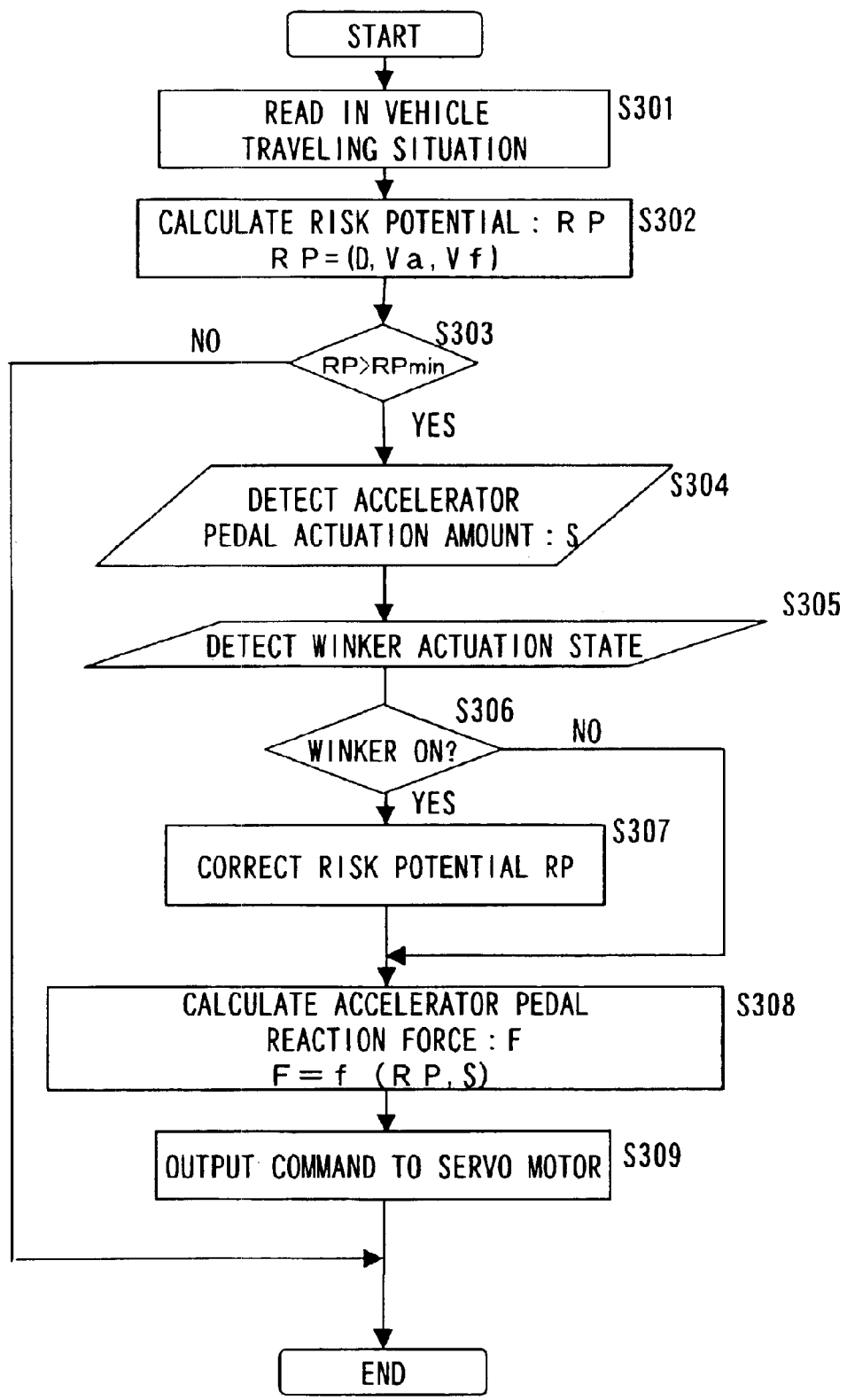
FIG. 14 is a flow chart showing the procedural flow of an accelerator pedal reaction force control program according to the third preferred embodiment of the present invention.

In the following, the procedural flow of the accelerator pedal reaction force control according to the third preferred embodiment of the present invention which was explained above will be explained using FIG. 14. FIG. 14 is a flow chart showing an example of a control program which is implemented by the controller 50A and the AF control device according to this third preferred embodiment. It should be understood that the procedure is performed repeatedly at time intervals of, for example 100 msec.

The processing in the steps S301 through S303 is the same as the processing in the steps S101 through S103 of the flow chart shown in FIG. 8 and described above in the first preferred embodiment of the present invention, and accordingly its explanation will be curtailed. If an affirmative decision is made in the step S303, so that the risk potential RP which has been calculated in the step S302 is greater than the minimum value RPmin, then the flow of control proceeds to the step S304.

In this step S304, the accelerator pedal actuation amount S which is detected by the accelerator pedal stroke sensor 81 is read in. In the next step S305, the actuation state of the winkers is detected based upon the signal from the winker actuation detector 30. In the next step S306, a decision is made as to whether or not the winkers are being actuated to be ON. If an affirmative decision is made in this step S306 so that it is decided that the winkers are being actuated to be ON and an intention on the part of the operator to change the vehicle lane has been detected, then the flow of control proceeds to the step S307.

In this step S307, the risk potential RP which has been calculated in the step S302 is corrected or adjusted. In concrete terms, the risk potential RP is multiplied by the constant kp as shown by the above described Equation (6), so as to calculate the corrected value RPc of the risk potential RP, and then this corrected value RPc of the risk potential RP is set as the actual risk potential RP.

On the other hand, if a negative decision is made in the step S306, so that no intention on the part of the operator to change the vehicle lane has been detected, then correction of the risk potential RP is not performed.

Then in the step S308 the reaction force increase amount $\Delta F$ is calculated using Equation (4), based upon the risk potential RP which has been calculated in the step S302 or the step S307. Furthermore, this reaction force increase amount $\Delta F$ which has been calculated is added to the normal reaction force characteristic, and thereby the accelerator pedal reaction force F which is to be generated for the accelerator pedal 60 is calculated. Then finally, in the next step S309, a command is outputted to the servo motor 80 to cause it to generate the accelerator pedal reaction force F which has been calculated in the step S308, and thereby the accelerator pedal reaction force control is performed.

In this way, with this third preferred embodiment of the present invention as explained above, the following advantages can be achieved.

(1) If the predetermined driving intention has been detected by the driving intention detection section 54, then the controller 50A adjusts the characteristic of the risk potential RP attributable to the vehicle condition of the subject vehicle and the traveling environment around the subject vehicle as detected by the laser radar 10, the front facing camera 20, and the vehicle speed sensor 40. By doing this, it is possible to calculate the risk potential RP which is in accordance with the actual feeling of the operator. Furthermore, it is possible to perform the accelerator pedal reaction force control which is appropriately matched to the sense of the operator.

(2) The characteristic of the risk potential RP is modified so as to reduce the risk potential RP if the predetermined driving intention of the operator has been detected, even if the vehicle condition and its traveling environment are the same as when no predetermined driving intention has been detected. By doing this, it is possible to calculate a risk potential RP which accords with the risk perceived by the operator. In particular, if an intention on the part of the operator to change the lane in which the subject vehicle is traveling has been detected as the predetermined driving intention, then it is possible to calculate a risk potential RP which accords with the risk which the operator actually senses. For example, considering the case when another vehicle is present in the neighboring vehicle lane so that it is not actually possible for the operator to perform vehicle lane changing and the subject vehicle is approaching towards the preceding vehicle irrespective of an intention of the operator to change the vehicle lane. In this case, the risk potential RP is calculated to be lower, as compared with when there is no intention on the part of the operator to change the vehicle lane. In this manner, it is possible to calculate the risk potential RP which the operator actually senses.

(3) If the predetermined driving intention has been detected by the driving intention detection section 54, then the predetermined constant kp is inserted into the calculation equation for the risk potential RP as shown by Equation (6), so that the risk potential RP is corrected so as to be smaller. By doing this, it is possible easily to calculate the risk potential RP which the operator actually senses.

Fourth Embodiment

In the following, the driving assist system for a vehicle according to the fourth preferred embodiment of the present invention will be explained. The structure of this fourth preferred embodiment of the vehicle driving assist system is the same as that of the third preferred embodiment shown in FIG. 13 and described above, and accordingly its description will herein be curtailed. This fourth preferred embodiment of the present invention differs from the third preferred embodiment, in the method of correction of the risk potential RP by the risk potential modification section 54.

If another vehicle is present in the neighboring vehicle lane in the vicinity of the subject vehicle at the spot to which overtaking of the preceding vehicle or vehicle lane changing is to be performed, it is necessary for the subject vehicle to wait in its current vehicle lane until the neighboring vehicle lane becomes clear. While the operator is waiting for changing the vehicle lane, the risk which is actually perceived by the operator is lower as compared to the case in which he has no intention to change the vehicle lane, even if the subject vehicle follows after the preceding vehicle while remaining closely approached to it.

Thus, in this fourth preferred embodiment of the present invention, if an intention on the part of the operator to change the vehicle lane has been detected by the driving intention detection section 54, the risk potential modification section 56 calculates a corrected value RPc1 of the risk potential RP using the following Equation (7):

$$RPc1 = kpw \cdot a/THW + b/TTC \tag{Equation 7}$$

Here kpw is a constant, and its value should be appropriately selected in the range of 0<kpw<1. It should be understood that, since the relative speed Vr is equal to zero when the subject vehicle is following after the preceding vehicle, therefore the second term on the right side of Equation (7) (i.e. b/TTC) is in practice equal to zero.

As will be understood from Equation (7), in particular when the operator is waiting for changing the vehicle lane while the subject vehicle is traveling after the preceding vehicle, the risk potential RP can be set to be smaller, as compared with the risk potential RP which is calculated using Equation (3) when no such intention to change the vehicle lane has been detected.

In this way, with this fourth preferred embodiment of the present invention as explained above, the following advantages can be achieved.

When the predetermined driving intention on the part of the operator has been detected by the driving intention detection section 54, the risk potential RP is corrected so as to be smaller by multiplying the predetermined constant kpw into the calculation equation for the risk potential RP, as shown in Equation (7). Here, the constant kpw is the coefficient which is multiplied into the reciprocal (1/THW) of THW. By doing this, it is possible easily to calculate the risk potential RP according to the sense of the operator. In particular, if another vehicle is present in the neighboring vehicle lane so that vehicle lane changing cannot be performed and the subject vehicle is following after the preceding vehicle quite close to it irrespective of an intention to change the vehicle lane of the subject vehicle, the risk potential RP is calculated to be smaller. By doing this, it is possible to calculate a risk potential which is attuned to the sense of the operator.

With the above described first through fourth preferred embodiments of the present invention, the intention on the part of the operator to change the vehicle lane was detected by the driving intention detection section 54 based upon actuation of the blinker system. However the present invention is not to be considered as being limited by this feature; for example, the intention on the part of the operator to change the vehicle lane could also be detected based upon the direction in which the operator is looking while driving the vehicle.

Detection of driving intention on the part of the operator based upon his direction of gaze may be performed according to the method which is disclosed in, for example, Japanese Patent Laid Open Publication No. H 2002-331850.

This driving intention detection device disclosed in Japanese Patent Laid Open Publication No. H 2002-331850 detects the driving intention on the part of the operator in, such as the following manner. The driving intention detection device calculates data E(θu, θv) specifying the direction of the gaze of the operator, based upon signals from a CCD camera and an infrared irradiation device. And the driving intention detection device calculates an eye direction frequency distribution F for the regions which are set in the direction in which the operator may gaze from this gaze direction data E(θu, θv) which have been calculated. The driving intention on the part of the operator can be deduced from the statistical characteristics of this eye direction frequency distribution F, according to predetermined driving behavior patterns.

In other words, the driving intention detection section 54 is one which detects the driving intention on the part of the operator to shift from the current traveling situation to a traveling situation which experiences no influence from the current preceding vehicle; and, for example, apart from detecting the intention on the part of the operator to change the vehicle traveling lane, it may also detect his intention to turn to the right or to the left.

Moreover, with the above described first through fourth preferred embodiments of the present invention, the reaction force increase amount ΔF is set so as to increase according to an exponential function with respect to the risk potential RP. However, the present invention is not to be considered as being limited by this feature. For example, it would also be possible to set the reaction force increase amount ΔF to increase linearly with respect to increase of the risk potential RP.

With the above described first through fourth preferred embodiments of the present invention, the vehicle condition of the subject vehicle and the traveling environment of the surroundings of the subject vehicle were detected using the laser radar 10, the front facing camera 20, and the vehicle speed sensor 40, but the present invention is not to be considered as being limited by this feature. For example, it would also be possible to detect the traveling environment of the surroundings of the subject vehicle by using some other type of radar, such as millimeter-wave radar or the like.

In the above described first through fourth preferred embodiments of the present invention, the image processing section 51 and the driving intention detection section 54 were included in the controller 50 in the form of software of CPU. However, it is also possible to provide dedicated devices for performing image processing upon image signals from the front facing camera 20 and for detecting the driving intention of the operator, which are separated from the controller 50.

The above described embodiments are examples, and various modifications can be made without departing from the spirit and scope of the invention.

The disclosure of the following priority application is herein incorporated by reference:

Japanese Patent Application No. 2002-179913 filed Jun. 20, 2002.

What is claimed is:

1. A vehicle driving assist system, comprising:
   a travel situation detection device that detects a vehicle condition and a traveling environment around a subject vehicle;
   a risk potential calculation device that calculates a risk potential around the subject vehicle based upon detection results of the traveling situation detection device;
   an accelerator pedal reaction force calculation device that calculates an accelerator pedal reaction force command value based upon the risk potential which is calculated by the risk potential calculation device;
   an accelerator pedal reaction force generation device that generates an actuation reaction force for an accelerator pedal, according to the accelerator pedal reaction force command value which is calculated by the accelerator pedal reaction force calculation device;
   a driving intention detection device that detects a driving intention of an operator of the subject vehicle; and
   an accelerator pedal reaction force modification device that adjusts the actuation reaction force to be generated for the accelerator pedal, based upon a detection result of the driving intention detection device.

2. A vehicle driving assist system according to claim 1, wherein:
   the accelerator pedal reaction force calculation device calculates the accelerator pedal reaction force command value according to a characteristic (hereinafter termed a RP-F characteristic) of the accelerator pedal reaction force command value in terms of the risk potential; and
   the accelerator pedal reaction force modification device modifies the RP-F characteristic when a predetermined driving intention of the operator is detected by the driving intention detection device.

3. A vehicle driving assist system according to claim 2, wherein:
when the predetermined driving intention of the operator is detected, the accelerator pedal reaction force modification device modifies the RP-F characteristic so as to reduce the accelerator pedal reaction force command value as compared with a case in which the predetermined driving intention of the operator is not detected, even if the risk potential which is calculated by the risk potential calculation device is a same.

4. A vehicle driving assist system according to claim 2, wherein:
the accelerator pedal reaction force calculation device calculates the accelerator pedal reaction force command value according to a first reaction force characteristic set as the RP-F characteristic in which a minimum risk potential corresponds to a first reaction force command value, and a maximum risk potential corresponds to a second reaction force command value, wherein as the risk potential becomes greater between the minimum risk potential and the maximum risk potential, the accelerator pedal reaction force command value becomes greater, and when the risk potential exceeds the maximum risk potential, the accelerator pedal reaction force command value increases discontinuously to a third reaction force command value which is greater than the second reaction force command value; and
when the predetermined driving intention of the operator has been detected, the accelerator pedal reaction force modification device modifies the first reaction force characteristic so that the reaction force command value when the risk potential exceeds the maximum risk potential comes to be less than the third reaction force command value.

5. A vehicle driving assist system according to claim 2, wherein:
the accelerator pedal reaction force calculation device calculates the accelerator pedal reaction force command value according to a second reaction force characteristic set as the RP-F characteristic in which a minimum risk potential corresponds to a first reaction force command value, and a maximum risk potential corresponds to a second reaction force command value, wherein as the risk potential becomes greater between the minimum risk potential and the maximum risk potential, the accelerator pedal reaction force command value becomes greater; and
when the predetermined driving intention of the operator has been detected, the accelerator pedal reaction force modification device modifies the second reaction force characteristic so that as the risk potential becomes greater, the accelerator pedal reaction force command value becomes greater between the first reaction force command value corresponding to the minimum risk potential and a third reaction force command value corresponding to the maximum risk potential which is less than the second reaction force command value.

6. A vehicle driving assist system according to claim 1, wherein:
when the predetermined driving intention of the operator has been detected by the driving intention detection device, the accelerator pedal reaction force modification device modifies a characteristic of the risk potential with respect to the detection results of the traveling situation detection device which is used for calculating the risk potential by the risk potential calculation device.

7. A vehicle driving assist system according to claim 6, wherein:
when the predetermined driving intention of the operator has been detected, the accelerator pedal reaction force modification device modifies the characteristic of the risk potential so that the risk potential becomes smaller, as compared to a case when the predetermined driving intention of the operator has not been detected, even if the detection results of the traveling situation detection device are a same.

8. A vehicle driving assist system according to claim 6, wherein:
when the predetermined driving intention of the operator has been detected, the accelerator pedal reaction force modification device inserts a constant into a calculation equation for calculating the risk potential which is based upon the detection results of the traveling situation detection device and is used by the risk potential calculation device as the characteristic of the risk potential, so that the risk potential becomes smaller, as compared to a case when the predetermined driving intention of the operator has not been detected.

9. A vehicle driving assist system according to claim 1, wherein:
the driving intention which is detected by the driving intention detection device is an intention to change a vehicle lane.

10. A vehicle driving assist system according to claim 9, wherein:
the driving intention detection device detects an actuation state of a direction indicator of the subject vehicle, and detects the intention to change the vehicle lane based upon the actuation state of the direction indicator which has thus been detected.

11. A vehicle driving assist system according to claim 1, wherein:
the traveling situation detection device detects a subject vehicle speed, a relative speed of the subject vehicle and a preceding vehicle, and a vehicle distance between the subject vehicle and the preceding vehicle; and
the risk potential calculation device calculates the risk potential using a time headway which is based upon the subject vehicle speed and the vehicle distance, and a time to contact which is based upon the relative speed and the vehicle distance.

12. A vehicle driving assist system according to claim 1, wherein:
the driving intention detection device detects an actuation state of a direction indicator of the subject vehicle to detect the driving intention of the operator,
the accelerator pedal reaction force calculation device sets the accelerator pedal reaction force command value to increase continuously from a first reaction force command value corresponding to a minimum risk potential to a second reaction force command value corresponding to a maximum risk potential according to increase of the risk potential, and to increase discontinuously to a third reaction force command value which is greater than the second reaction force command value when the risk potential exceeds the maximum risk potential, and
when the driving intention detection device detects that the direction indicator has been actuated to be on, the accelerator pedal reaction force modification device adjusts the accelerator pedal reaction force command value to increase continuously when the risk potential exceeds the maximum risk potential.

13. A vehicle driving assist system according to claim 1, wherein:
the driving intention detection device detects an actuation state of a direction indicator of the subject vehicle to detect the driving intention of the operator,
the accelerator pedal reaction force calculation device sets the accelerator pedal reaction force command value to increase continuously according to increase of the risk potential, and
the accelerator pedal reaction force modification device adjusts the accelerator pedal reaction force command value to reduce a rate of change of the accelerator pedal reaction force command value with respect to the increase of the risk potential when the driving intention detection device detects that the direction indicator has been actuated to be on.

14. A vehicle driving assist system, according to claim 1, wherein:
the traveling situation detection device detects a subject vehicle speed, a relative speed of the subject vehicle and a preceding vehicle, and a vehicle distance between the subject vehicle and the preceding vehicle,
the risk potential calculation device calculates a time headway using the subject vehicle speed and the vehicle distance, and a time to contact using the relative speed and the vehicle distance, and calculates the risk potential by a calculation equation which is based upon the time headway and the time to contact,
the driving intention detection device detects an actuation state of a direction indicator of the subject vehicle to detect the driving intention of the operator, and
the accelerator pedal reaction force modification device inserts a constant into the calculation equation to reduce the risk potential when the driving intention detection device detects that the direction indicator has been actuated to be on, in order to adjust the actuation reaction force for the accelerator pedal.

15. A vehicle driving assist system, comprising:
a travel situation detection means for detecting a vehicle condition and a traveling environment around a subject vehicle;
a risk potential calculation means for calculating a risk potential around the subject vehicle based upon detection results of the traveling situation detection means;
an accelerator pedal reaction force calculation means for calculating an accelerator pedal reaction force command value based upon the risk potential which is calculated by the risk potential calculation means;
an accelerator pedal reaction force generation means for generating an actuation reaction force for an accelerator pedal, according to the accelerator pedal reaction force command value which is calculated by the accelerator pedal reaction force calculation means;
a driving intention detection means for detecting a driving intention of an operator of the subject vehicle; and
an accelerator pedal reaction force modification means for adjusting the actuation reaction force to be generated for the accelerator pedal, based upon a detection result of the driving intention detection means.

16. A vehicle driving assist method, comprising:
detecting a vehicle condition and a traveling environment around a subject vehicle;
calculating a risk potential around the subject vehicle based upon the vehicle condition and the traveling environment around the subject vehicle;
calculating an accelerator pedal reaction force command value based upon the risk potential;
generating an actuation reaction force for an accelerator pedal, according to the accelerator pedal reaction force command value;
detecting a driving intention of an operator of the subject vehicle; and
adjusting the actuation reaction force to be generated for the accelerator pedal, based upon the driving intention of the operator.

17. A vehicle, comprising:
a travel situation detection device that detects a vehicle condition and a traveling environment around a subject vehicle;
a risk potential calculation device that calculates a risk potential around the subject vehicle based upon detection results of the traveling situation detection device;
an accelerator pedal reaction force calculation device that calculates an accelerator pedal reaction force command value based upon the risk potential which is calculated by the risk potential calculation device;
an accelerator pedal reaction force generation device that generates an actuation reaction force for an accelerator pedal, according to the accelerator pedal reaction force command value which is calculated by the accelerator pedal reaction force calculation device;
a driving intention detection device that detects a driving intention of an operator of the subject vehicle; and
an accelerator pedal reaction force modification device that adjusts the actuation reaction force to be generated for the accelerator pedal, based upon a detection result of the driving intention detection device.

18. A driving assistance system comprising:
a detection device configured to detect an operation condition associated with a vehicle;
a risk potential calculation device configured to calculate a risk potential based on the operation condition;
a driving control device configured to receive an input from the driver of the vehicle for operating the vehicle;
a driving intention detection device configured to detect a driving intention of the driver of the vehicle; and
a reaction force control device configured to provide a reaction force applied to the driving control device based on the risk potential and the driving intention.

19. A driving assistance system comprising:
means for detecting an operation condition associated with a vehicle;
means for calculating a risk potential based on the operation condition;
means for receiving an input from the driver of the vehicle for operating the vehicle;
means for detecting a driving intention of the driver of the vehicle; and
means for providing a reaction force applied to the means for receiving an input from the driver based on the risk potential and the driving intention.

20. A driving assistance method comprising the steps of:
detecting an operation condition associated with a vehicle;
calculating a risk potential based on the operation condition;
detecting a driving intention of the driver of the vehicle; and providing a reaction force applied to a driving control device based on the risk potential and the driving intention, wherein the driving control device is configured to receive an input from the driver of the vehicle for operating the vehicle.

21. A vehicle comprising:

a detection device configured to detect an operation condition associated with the vehicle;

a risk potential calculation device configured to calculate a risk potential based on the operation condition;

a driving control device configured to receive an input from the driver of the vehicle for operating the vehicle;

a driving intention detection device configured to detect a driving intention of the driver of the vehicle; and a reaction force control device configured to provide a reaction force applied to the driving control device based on the risk potential and the driving intention.

* * * * *